(12) United States Patent
Zhao

(10) Patent No.: US 11,813,819 B2
(45) Date of Patent: Nov. 14, 2023

(54) BARRIER LAMINATES AND METHODS OF MAKING THE SAME

(71) Applicant: AVINTIV Specialty Materials Inc., Charlotte, NC (US)

(72) Inventor: Rongguo Zhao, Mooresville, NC (US)

(73) Assignee: AVINTIV Specialty Materials Inc., Charlotte, NC (US)

( * ) Notice: Subject to any disclaimer, the term of this patent is extended or adjusted under 35 U.S.C. 154(b) by 0 days.

(21) Appl. No.: 17/723,684

(22) Filed: Apr. 19, 2022

(65) Prior Publication Data

US 2022/0242085 A1 Aug. 4, 2022

Related U.S. Application Data

(60) Continuation of application No. 16/823,458, filed on Mar. 19, 2020, now Pat. No. 11,331,875, which is a
(Continued)

(51) Int. Cl.
| | |
|---|---|
| *B32B 1/08* | (2006.01) |
| *B32B 5/02* | (2006.01) |
| *B32B 27/28* | (2006.01) |
| *B32B 7/05* | (2019.01) |
| *B32B 27/12* | (2006.01) |
| *B32B 27/34* | (2006.01) |
| *B32B 27/08* | (2006.01) |

(Continued)

(52) U.S. Cl.
CPC ............ *B32B 1/08* (2013.01); *B32B 5/022* (2013.01); *B32B 7/05* (2019.01); *B32B 27/08* (2013.01); *B32B 27/12* (2013.01); *B32B 27/28* (2013.01); *B32B 27/285* (2013.01); *B32B 27/34* (2013.01); *B32B 27/40* (2013.01); *A41D 31/04* (2019.02); *B32B 2250/02* (2013.01); *B32B 2255/02* (2013.01); *B32B 2262/0253* (2013.01); *B32B 2262/0261* (2013.01); *B32B 2262/0276* (2013.01); *B32B 2264/10* (2013.01); *B32B 2264/101* (2013.01); *B32B 2264/102* (2013.01); *B32B 2264/104* (2013.01); *B32B 2264/108* (2013.01); *B32B 2274/00* (2013.01); *B32B 2307/50* (2013.01); *B32B 2307/54* (2013.01); *B32B 2307/724* (2013.01); *B32B 2307/728* (2013.01); *B32B 2307/7265* (2013.01); *B32B 2437/00* (2013.01); *B32B 2597/00* (2013.01)

(58) Field of Classification Search
CPC ........................................................ B32B 1/08
See application file for complete search history.

(56) References Cited

U.S. PATENT DOCUMENTS 4,991,232 A 2/1991 Taylor
5,271,100 A * 12/1993 Holt .................... A41D 13/1209
2/114
(Continued)

*Primary Examiner* — Andrew T Piziali
(74) *Attorney, Agent, or Firm* — BURR & FORMAN LLP

(57) ABSTRACT

Articles comprising an outer fabric layer and a laminate are provided. The laminate may include a barrier film layer and an inner fabric layer, in which the outer fabric layer at least partially encircles and overlies the laminate. The outer fabric layer comprises an outer fabric layer seal and the laminate comprises a laminate seal that is separate and distinct from the outer fabric seal. The articles may be devoid of any bonds between the outer fabric layer and the laminate.

20 Claims, 10 Drawing Sheets

Related U.S. Application Data division of application No. 15/620,921, filed on Jun. 13, 2017, now Pat. No. 10,632,714.

(60) Provisional application No. 62/349,725, filed on Jun. 14, 2016.

(51) Int. Cl.
*B32B 27/40* (2006.01)
*A41D 31/04* (2019.01)

(56) References Cited

U.S. PATENT DOCUMENTS

| | | | |
|---|---|---|---|
| 5,682,618 A * | 11/1997 | Johnson | B29C 66/939 |
| | | | 2/457 |
| 5,765,597 A | 6/1998 | Kiest, Jr. et al. | |
| 5,794,663 A | 8/1998 | Kiest, Jr. et al. | |
| 5,813,052 A | 9/1998 | Taylor | |
| 6,187,696 B1 | 2/2001 | Lim et al. | |
| 6,261,674 B1 | 7/2001 | Branham et al. | |
| 6,602,809 B1 | 8/2003 | Cabrey | |
| 6,632,212 B1 | 10/2003 | Morman et al. | |
| 6,638,605 B1 | 10/2003 | Ankuda, Jr. et al. | |
| 6,649,548 B1 | 11/2003 | Shawver et al. | |
| 6,706,225 B2 | 3/2004 | Cabrey | |
| 6,732,763 B2 | 5/2004 | Williamson et al. | |
| 7,381,666 B2 | 6/2008 | Little et al. | |
| 7,390,376 B2 | 6/2008 | Palomo et al. | |
| 7,718,555 B1 | 5/2010 | Smith et al. | |
| 8,034,440 B2 | 10/2011 | Morman et al. | |
| 8,551,896 B2 | 10/2013 | Mansfield | |
| 9,452,595 B2 | 9/2016 | Cartier et al. | |
| 2001/0008027 A1 * | 7/2001 | Duplock | B32B 27/12 |
| | | | 2/69 |
| 2002/0106959 A1 * | 8/2002 | Huffines | A61F 13/51478 |
| | | | 442/381 |
| 2004/0097158 A1 | 5/2004 | Rudisill et al. | |
| 2006/0041988 A1 | 3/2006 | Bushman | |
| 2006/0085887 A1 | 4/2006 | Palomo et al. | |
| 2014/0273689 A1 | 9/2014 | Carroll et al. | |

* cited by examiner

BARRIER LAMINATES AND METHODS OF MAKING THE SAME

PRIORITY CLAIM

This application is a continuation of U.S. application Ser. No. 16/823,458 filed on Mar. 19, 2020, which is a divisional of U.S. Non-Provisional application Ser. No. 15/620,921 filed Jun. 13, 2017 that issued on Apr. 28, 2020 as U.S. Pat. No. 10,632,714, which claims priority under 35 U.S.C. § 119(e) to U.S. Provisional Application Ser. No. 62/349,725, filed on Jun. 14, 2016, each of which are expressly incorporated by reference herein in their entirety.

TECHNICAL FIELD

Embodiments of the presently-disclosed invention relate generally to barrier laminates (e.g., trilaminates) comprising an outer fabric layer and a laminate (e.g., a bilaminate) including a barrier film layer and an inner fabric layer, in which the outer fabric layer at least partially encircles and overlies the laminate.

BACKGROUND

According to Association for the Advancement of Medical Instrumentation (AAMI), surgical gowns are classified into 4 categories (i.e., AAMI 1, 2, 3 and 4, with AAMI 4 providing the highest protective level).

Barrier laminates suitable for AAMI 4-rated barrier laminates (e.g., surgical gowns) must pass stringent tests that evaluate barrier properties and whether the exhibited barrier properties would prevent body fluid and viral penetration, for example, while keeping a high level of breathability to ensure a wearer's comfort. These tests are known as ASTM F1670 and F1671. For a barrier laminate to be suitable for use as an AAMI 4-rated barrier laminate for use in construction of, for example, surgical gowns, the gown chest and its sleeves must each successfully pass these tests. Furthermore, the seam areas of sleeves must also pass these tests.

For some barrier laminate materials (e.g., having a nonwoven-film-nonwoven structure), however, impermeable seams formed from the barrier laminate materials is difficult to consistently offer while using a thermal bonding method known as heat sealing. Less than desirable seam barrier properties may occur when the basis weight of, for example, when material incompatibility between the film forming the core of the barrier laminate and the nonwoven layers forming the skins of the barrier laminate.

Therefore, there remains a need in the art for articles (e.g., formed of barrier laminates in the form of surgical gowns, sleeves, surgical drapes, pant legs, etc.) including seams providing excellent barrier properties and methods of making such articles.

SUMMARY OF INVENTION

One or more embodiments of the invention may address one or more of the aforementioned problems. Certain embodiments according to the invention provide articles, such as barrier laminates that may be provided in a variety of geometric forms, that include (i) an outer fabric layer including an outer fabric layer seal formed between a first outer fabric layer side and a second outer fabric layer side to provide a hollow outer fabric layer structure defining an outer fabric layer conduit and (ii) a laminate, which may be at least partially encircled by the outer fabric layer and located within the hollow outer fabric layer structure, including a barrier film layer and an inner fabric layer. The laminate may comprise a laminate seal, which is separate and distinct from the outer fabric layer seal, formed between a first laminate side and a second laminate side to provide a hollow laminate structure defining a laminate conduit. In this regard, embodiments of the invention comprise articles (e.g., barrier laminates) including two separate and distinct seals to provide articles with seams exhibiting improved seam barrier properties. For example, the configuration using two separate and distinct seals, as discussed herein, eliminate seam failure issues related to, at least, material incompatibility issues between an outermost fabric layer and a core barrier layer as realized by traditional articles formed from barrier laminates (e.g., nonwoven-film-nonwoven barrier laminates).

In one aspect, the invention provides articles (e.g., barrier laminates in the form of surgical gowns, sleeves, surgical drapes, pant legs, etc.) comprising an outer fabric layer and a laminate comprising at least a barrier film layer and an inner fabric layer, in which the outer fabric layer at least partially encircles and overlies the laminate. In accordance with certain embodiments of the invention, the barrier film layer may be located either directly or indirectly between the outer fabric layer and the inner fabric layer. For example, articles may comprise a trilaminate including the barrier film layer directly adjacent to and sandwiched between both the outer fabric layer and the inner fabric layer. In accordance with certain embodiments of the invention, the articles may be devoid of bonds (e.g., mechanical bonds, thermal bonds, etc.) between the outer fabric layer and the laminate. As noted above, the outer fabric layer may comprise an outer fabric layer seal formed between a first outer fabric layer side and a second outer fabric layer side to provide a hollow outer fabric layer structure defining an outer fabric layer conduit and the laminate may comprise a laminate seal, which is separate and distinct from the outer fabric layer seal, formed between a first laminate side and a second laminate side to provide a hollow laminate structure defining a laminate conduit. In this regard, certain embodiments of the invention may comprise two separate and distinct seals, while the outer fabric layer and the laminate (e.g., bilaminate encircled by the outer fabric layer) may not be bonded to each other (e.g., devoid of bonds therebetween). Certain embodiments of the present invention mitigate or eliminate incompatibility issues often associated with seals (e.g., seams including a seal) of traditional barrier articles (e.g., barrier laminates) having a nonwoven-film-nonwoven structure. Certain embodiments of the invention provide barrier articles suitable for passing synthetic blood barrier testing (F1670) and viral barrier testing (F1671).

In another aspect, the present invention provides a method of making barrier laminates (and articles comprising such barrier laminates). Methods, in accordance with certain embodiments of the invention, comprise a step of providing an outer fabric layer, in which the outer fabric layer includes a first outer fabric layer side, a second outer fabric layer side, a first outer fabric layer end, and a second outer fabric layer end. The methods may also comprise a step of forming a hollow outer fabric layer structure (e.g., a sleeve or tube structure) comprising an outer fabric layer conduit by bonding the first outer fabric layer side to the second outer fabric layer side to form an outer fabric layer seal extending from the first outer fabric layer end to the second outer fabric layer end. The methods may also comprise a step of providing a laminate including a barrier film layer and an inner fabric layer, in which the laminate includes a first laminate side, a second laminate side, a first laminate end, and a second laminate end. In accordance with certain embodiments of the invention, the methods may comprise encircling the hollow outer fabric layer structure with the laminate, in which the barrier layer film is located either directly or indirectly between the outer fabric layer and the inner fabric layer. The methods may also comprise a step of forming a hollow laminate structure (e.g., a sleeve or tube structure) comprising a laminate conduit by bonding the first laminate side to the second laminate side to form a laminate seal extending from the first laminate end to the second laminate end to form an intermediate barrier laminate, in which the hollow laminate structure encircles (e.g., concentrically encircles) the hollow outer fabric layer structure. In this regard, certain embodiments of the invention may comprise separately forming the hollow outer fabric layer structure (e.g., a sleeve or tube structure) and the hollow laminate structure (e.g., a sleeve or tube structure) followed by inserting the hollow outer fabric layer structure inside the hollow laminate structure such that the hollow outer fabric layer structure is encircled by the hollow laminate structure to form the intermediate barrier laminate. Methods, in accordance with certain embodiments of the invention, may comprise a step of inverting the intermediate barrier laminate (e.g., turning the intermediate barrier laminate inside-out) to form the barrier laminate, in which the outer fabric layer encircles the laminate at the completion of the inverting step.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

Figure 4A:
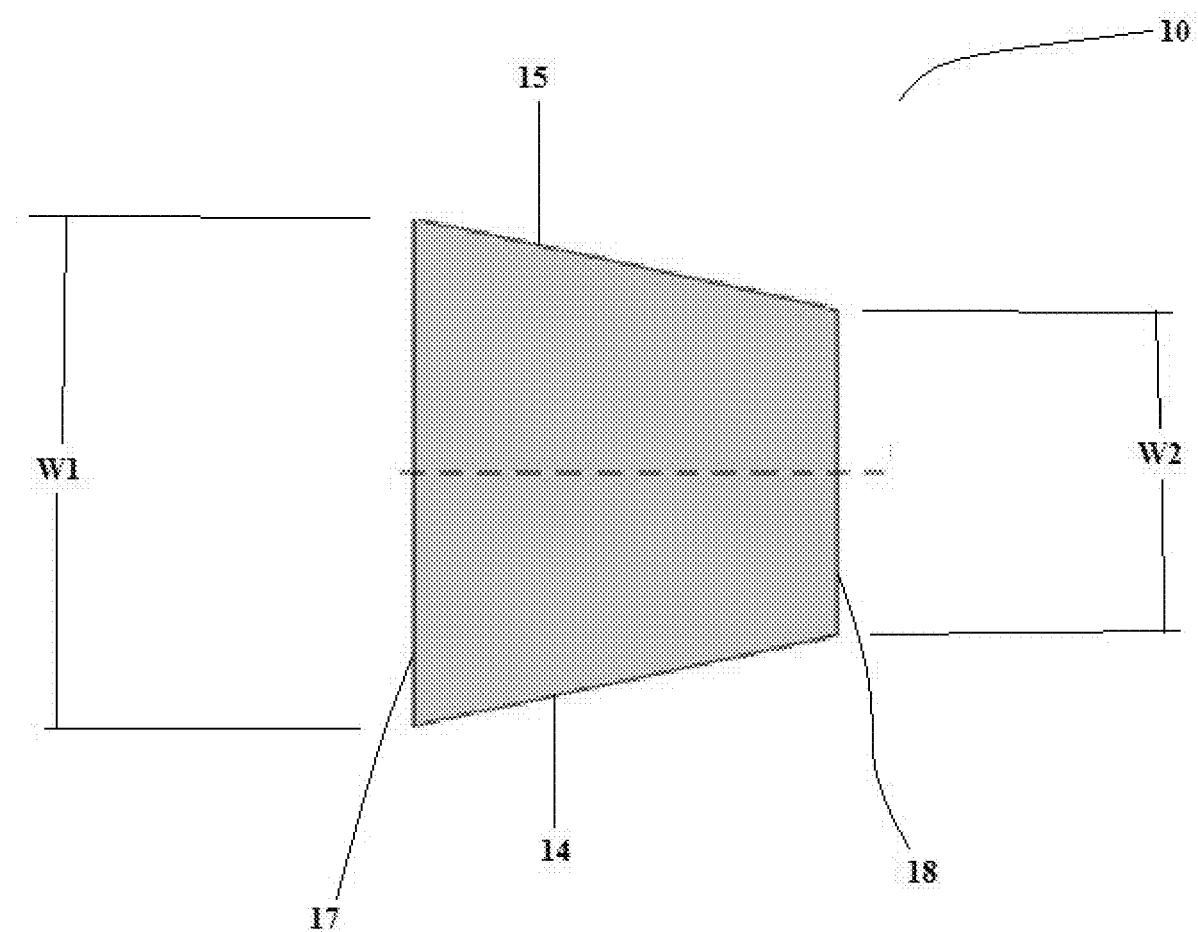
Figure 4B:
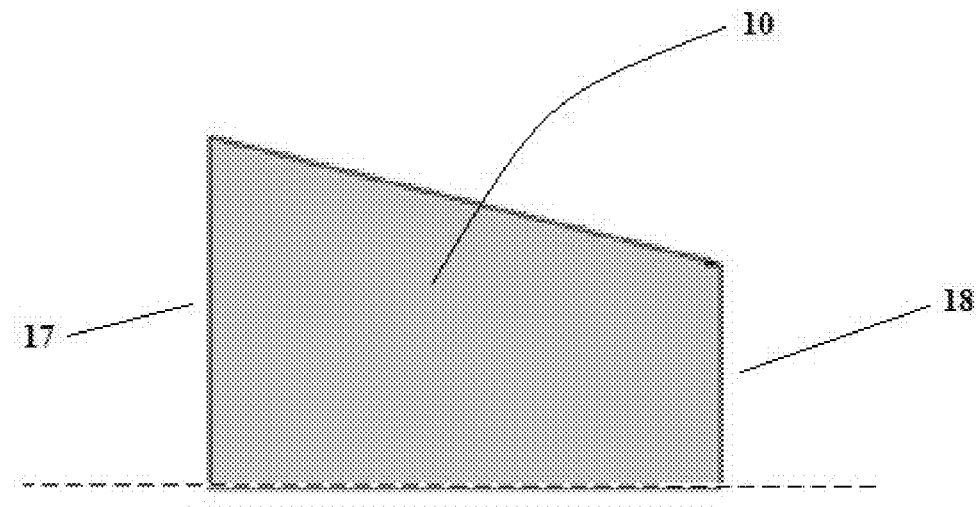
Figure 4C:
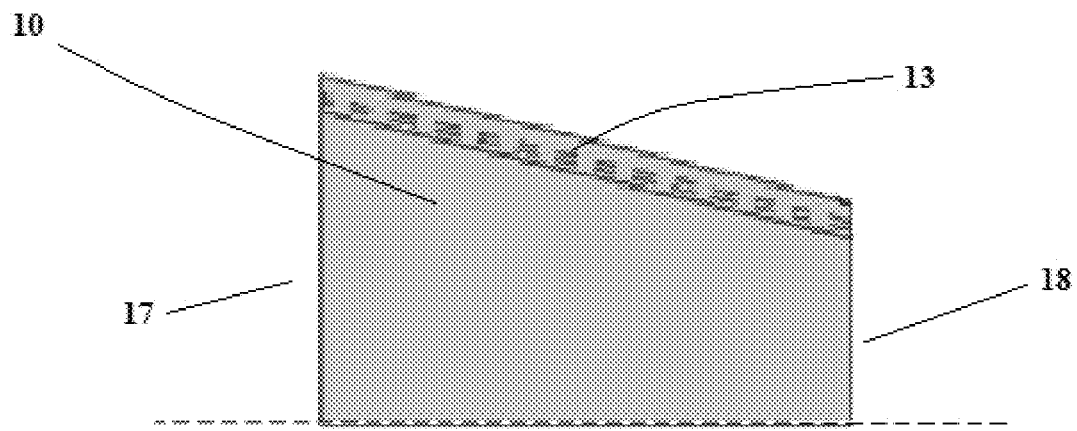
Figure 5A:
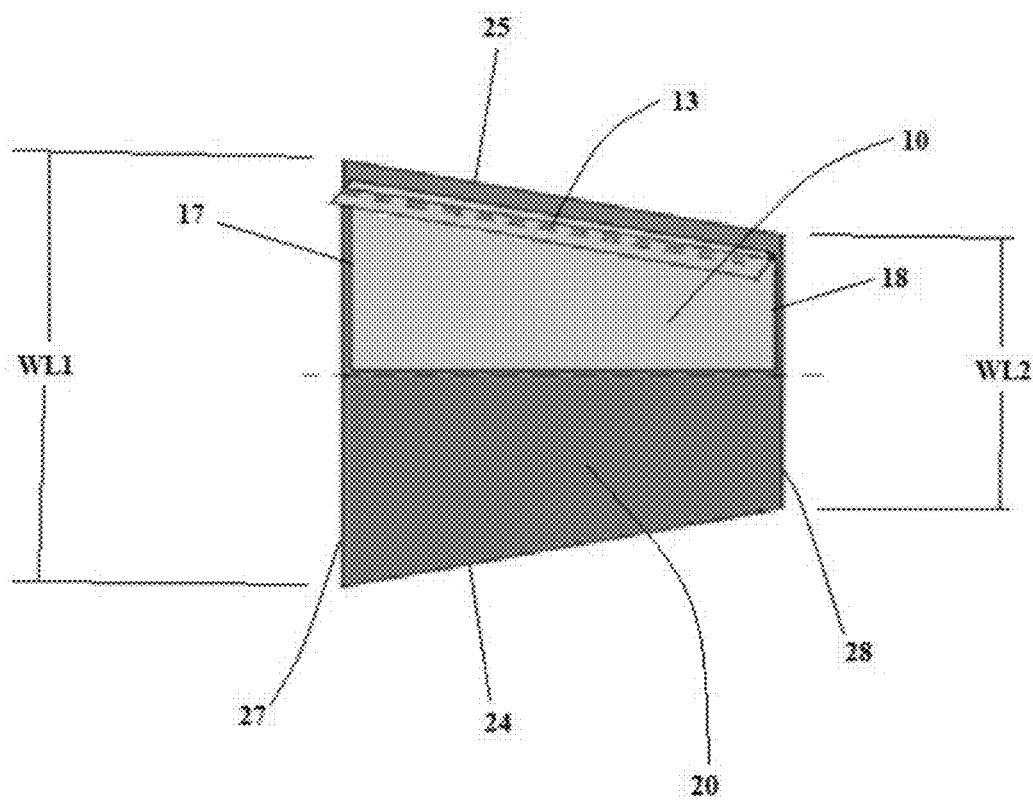
Figure 5B:
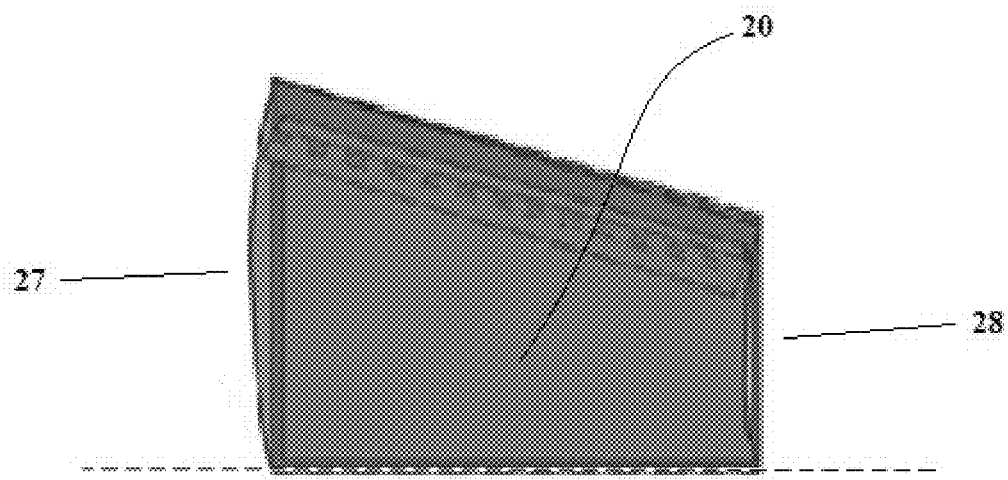
Figure 5C:
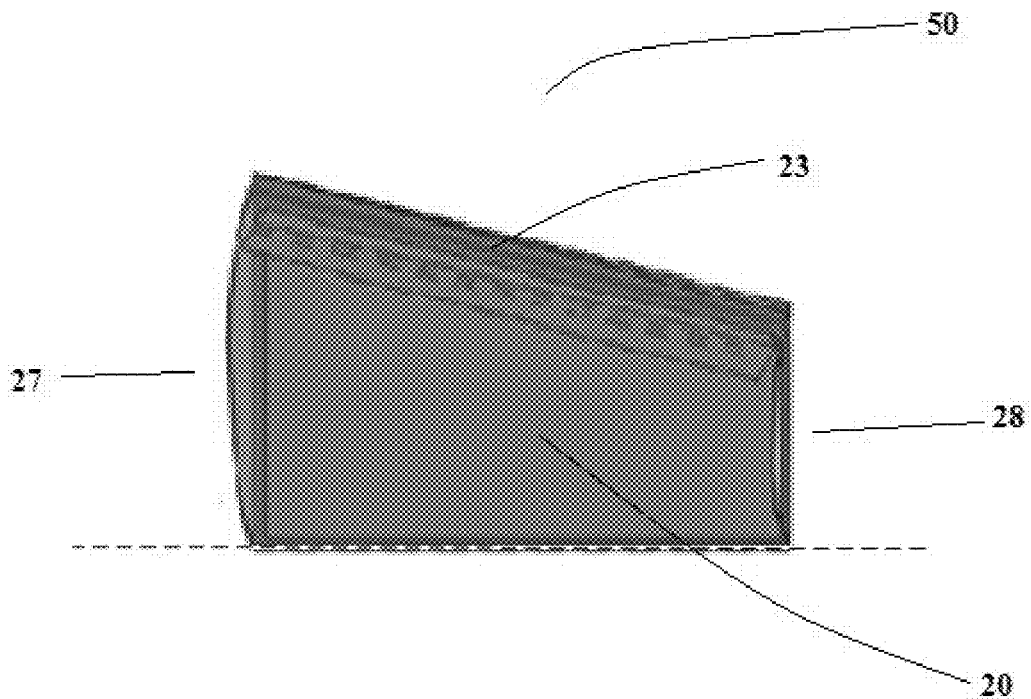
Figure 6A:
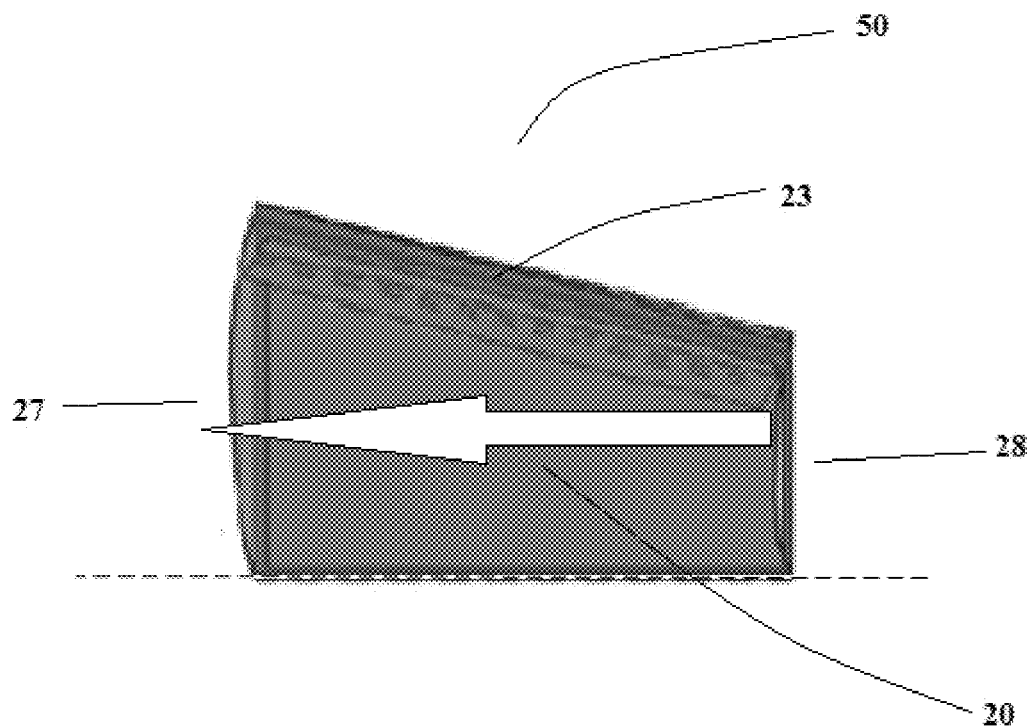
Figure 6B:
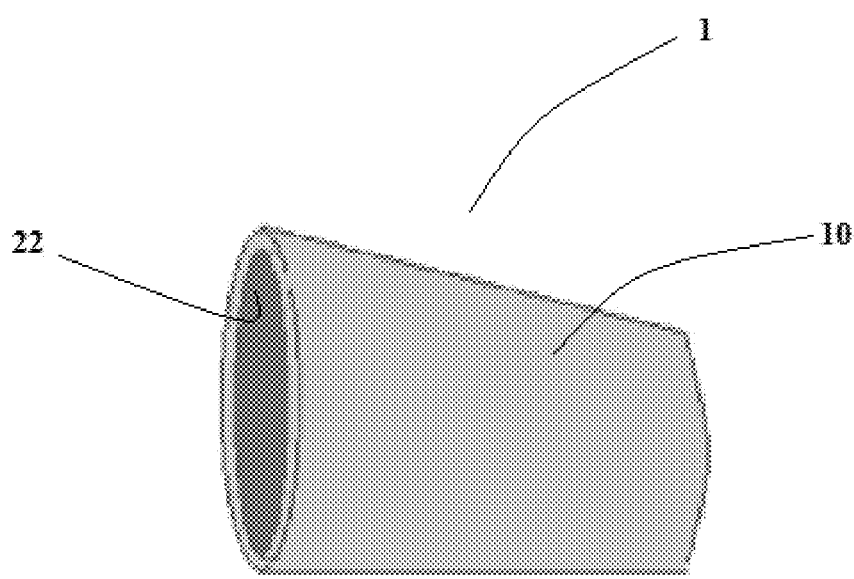

FIGS. 4A-4C each illustrate individual steps in a method of making a barrier laminate according to an example embodiment of the invention;

FIGS. 5A-5C each illustrate individual steps, performed after steps illustrated in FIGS. 4A-4C, in a method of making a barrier laminate according to an example embodiment of the invention;

FIG. 6A illustrates a step of inverting an intermediate barrier laminate formed in FIG. 5C; and FIG. 6B illustrates the barrier laminate at the completion of the inverting step illustrated in FIG. 6A.

DETAILED DESCRIPTION

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The invention includes articles, such as barrier laminates that may be provided in a variety of geometric forms, that include an outer fabric layer including an outer fabric layer seal formed between a first outer fabric layer side and a second outer fabric layer side to provide a hollow outer fabric layer structure defining an outer fabric layer conduit and a laminate, which may be at least partially encircled by the outer fabric layer and located within the hollow outer fabric layer structure, including a barrier film layer and an inner fabric layer. The laminate may comprise a laminate seal, which is separate and distinct from the outer fabric layer seal, formed between a first laminate side and a second laminate side to provide a hollow laminate structure defining a laminate conduit. In accordance with certain embodiments of the invention, the laminate seal may be formed by directly bonding (e.g., thermally bonding) the barrier film layer to itself. The laminate seal, in according with such embodiments of the invention, comprises a nonwoven-film-film-nonwoven structure by directly bonding (e.g., thermally bonding) the barrier film layer of the laminate to itself. A laminate seal having the nonwoven-film-film-nonwoven structure eliminates the presence of a fabric layer between the portions of the barrier film layer bonded to each other to provide a laminate seal exhibiting improved liquid impermeability. In this regard, embodiments of the present invention comprise articles (e.g., barrier laminates) including two separate and distinct seals to provide articles with seams exhibiting improved seam barrier properties. For example, the configuration using two separate and distinct seals, as discussed herein, eliminate seam failure issues related to, at least, material incompatibility issues between an outermost fabric layer and a core barrier layer as realized by traditional articles formed from barrier laminates (e.g., nonwoven-film-nonwoven barrier laminates). In accordance with certain embodiments of the invention, the barrier film layer may be located either directly or indirectly between the outer fabric layer and the inner fabric layer. For example, articles may comprise a trilaminate including the barrier film layer directly adjacent to and sandwiched between both the outer fabric layer and the inner fabric layer. In accordance with certain embodiments of the invention, the articles may be devoid of bonds (e.g., mechanical bonds, adhesive bonds, thermal bonds, etc.) between the outer fabric layer and the laminate. In this regard, for example, certain embodiments of the invention form articles (e.g., barrier laminates in a sleeve or tube structure) from, for example, two different and separate media (e.g., outer fabric layer and laminate including a breathable liquid impervious film and a nonwoven laminated together) that have been sealed individually and combined into an article (e.g., barrier laminates in a sleeve or tube structure).

Articles, according to certain embodiments of the invention, may comprise a variety of shapes or forms and utilized in a variety of end-use applications that may require liquid barrier properties. By way of example only, articles according to certain embodiments of the invention may be provided in the form of a surgical bodysuit, surgical gown, surgical sleeves, etc. For example, the surgical gown market has a need for surgical gowns with sleeve seams having both strength (e.g., seam tensile strength) and liquid barrier properties (e.g., hydrostatic head, IPA penetration resistance, and ultimately F1670 (synthetic blood barrier test)/F1671 (viral barrier test) compliance). In this regard, certain embodiments of the invention, may comprise surgical gowns with sleeve seams having a sealing mechanism (e.g., two separate and discrete seams as disclosed herein) that provides surgical gowns/surgical sleeves with AAMI 4-rated seams and/or seals. In this regard, certain embodiments of the invention address the simultaneous needs of seam strength (e.g., seal strength at seams) and barrier properties associated with a sealed seam by managing them separately (e.g., two separate and discrete seams as disclosed herein) to provide AAMI 4-rated articles (e.g., sleeves, pants, gowns, etc.). For instance, articles according to certain embodiments of the invention may be devoid of bonds (e.g., mechanical bonds, adhesive bonds, thermal bonds, etc.) between the outer fabric layer and the laminate. In accordance with certain embodiments of the invention, an article (e.g., a trilaminate including the barrier film layer sandwiched between both the outer fabric layer and the inner fabric layer) may be incorporated into a larger structure or attached to a separate and distinct second article (e.g., a body portion of a surgical gown). In this regard, articles according to certain embodiments of the invention may comprise one or more bonds attaching the article to a separate and distinct second article (e.g., a body portion of a surgical gown). In such embodiments, for example, the article (e.g., a trilaminate including the barrier film layer sandwiched between both the outer fabric layer and the inner fabric layer) may be devoid of bonds between the outer fabric layer and the laminate except for the one or more bonds attaching the article to the separate and distinct second article. In accordance with certain embodiments of the invention, an overlapping area between the outer fabric layer and the laminate may comprise an unbounded portion being devoid of bonds between the outer fabric layer and the laminate. In accordance with certain embodiments of the invention, the unbounded portion may comprise from about 75% to about 100% of the overlapping area (e.g., from about 75% to about 100% of the overlapping area may be devoid of bonds). In accordance with certain embodiments of the invention, the unbounded portion may comprise from at least about any of the following: 75, 80, 85, 90, and 95% of the overlapping area and/or at most about 100, 99, 98, 97, 96, and 95% of the overlapping area (e.g., about 90 to about 100%, about 95% to about 98%, etc.). In accordance with certain embodiments of the invention, the unbounded portion may be located between two separate and distinct bonded portions. For example, the two separate and distinct bonded portions may be located at or near the ends of the article and may be provided to attach the article to a separate and distinct second article, such as a body portion of a surgical gown and/or a cuff. By way of example only, a first bonded portion may be provided to attach a first end of the article to a body portion of a surgical gown and a second bonded portion may be provided to attach or form a cuff at the opposite end of the article.

The terms "substantial" or "substantially" may encompass the whole amount as specified, according to certain embodiments of the invention, or largely but not the whole amount specified according to other embodiments of the invention.

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers; stereoisomers including, without limitation, geometric isomers, optical isomers or enantionmers; and/or any chiral molecular configuration of such polymer or polymeric material. These configurations include, but are not limited to, isotactic, syndiotactic, and atactic configurations of such polymer or polymeric material. The term "polymer" or "polymeric" shall also include polymers made from various catalyst systems including, without limitation, the Ziegler-Natta catalyst system and the metallocene/single-site catalyst system. The term "polymer" or "polymeric" shall also include, in according to certain embodiments of the invention, polymers produced by fermentation process or biosourced.

The terms "nonwoven" and "nonwoven web", as used herein, may comprise a web having a structure of individual fibers, filaments, and/or threads that are interlaid but not in an identifiable repeating manner as in a knitted or woven fabric. Nonwoven fabrics or webs, according to certain embodiments of the invention, may be formed by any process conventionally known in the art such as, for example, meltblowing processes, spunbonding processes, hydroentangling, air-laid, and bonded carded web processes.

The term "staple fiber", as used herein, may comprise a cut fiber from a filament. In accordance with certain embodiments, any type of filament material may be used to form staple fibers. For example, staple fibers may be formed from cellulosic fibers, polymeric fibers, and/or elastomeric fibers. Examples of materials may comprise cotton, rayon, wool, nylon, polypropylene, and polyethylene terephthalate. The average length of staple fibers may comprise, by way of example only, from about 2 centimeter to about 15 centimeter.

The term "spunbond", as used herein, may comprise fibers which are formed by extruding molten thermoplastic material as filaments from a plurality of fine, usually circular, capillaries of a spinneret with the diameter of the extruded filaments then being rapidly reduced. According to an embodiment of the invention, spunbond fibers are generally not tacky when they are deposited onto a collecting surface and may be generally continuous. It is noted that the spunbond used in certain composites of the invention may include a nonwoven described in the literature as SPINLACE®.

The term "meltblown", as used herein, may comprise fibers formed by extruding a molten thermoplastic material through a plurality of fine die capillaries as molten threads or filaments into converging high velocity, usually hot, gas (e.g. air) streams which attenuate the filaments of molten thermoplastic material to reduce their diameter, which may be to microfiber diameter, according to certain embodiments of the invention. According to an embodiment of the invention, the die capillaries may be circular. Thereafter, the meltblown fibers are carried by the high velocity gas stream and are deposited on a collecting surface to form a web of randomly disbursed meltblown fibers. Meltblown fibers are microfibers which may be continuous or discontinuous and are generally tacky when deposited onto a collecting surface.

The term "hydroentangle" or "hydroentangled", as used herein, may comprise a process for bonding a nonwoven fabric by using high pressure water jets to intermingle the fibers. Several rows of water jets are directed against the fiber web, which is supported by a movable fabric. Fiber entanglements are introduced by the combined effects of the water jets and the turbulent water created in the web, which intertwines neighboring fibers.

The term "layer", as used herein, may comprise a generally recognizable combination of similar material types and/or functions existing in the X-Y plane.

As used herein, the term "proximate" in the context of the relative positioning of two particular layers of a multilayer film may comprise the positioning of a layer being one or more layers removed from another layer. For example, the term "proximate" in the context of the relative positioning of a first layer and a second layer may mean that the first and second layers may be separated by 1, 2, 3, or more intermediate layers, such as layers positioned between the core layer and a skin layer. Layers that are positioned proximate to one another are adequately positioned so as to achieve a desired construct and/or functionality.

The term "bicomponent fibers", as used herein, may comprise fibers formed from at least two different polymers extruded from separate extruders but spun together to form one fiber. Bicomponent fibers are also sometimes referred to as conjugate fibers or multicomponent fibers. The polymers are arranged in a substantially constant position in distinct zones across the cross-section of the bicomponent fibers and extend continuously along the length of the bicomponent fibers. The configuration of such a bicomponent fiber may be, for example, a sheath/core arrangement wherein one polymer is surrounded by another, or may be a side-by-side arrangement, a pie arrangement, or an "islands-in-the-sea" arrangement, each as is known in the art of multicomponent, including bicomponent, fibers. The "bicomponent fibers" may be thermoplastic fibers that comprise a core fiber made from one polymer that is encased within a thermoplastic sheath made from a different polymer or have a side-by-side arrangement of different thermoplastic fibers. The first polymer often melts at a different, typically lower, temperature than the second polymer. In the sheath/core arrangement, these bicomponent fibers provide thermal bonding due to melting of the sheath polymer, while retaining the desirable strength characteristics of the core polymer. In the side-by-side arrangement, the fibers shrink and crimp creating z-direction expansion.

As used herein, the term "monolithic" film may comprise any film that is continuous and substantially free or free of pores (e.g., devoid of pores). In certain alternative embodiments of the invention, a "monolithic" film may comprise fewer pore structures than would otherwise be found in a microporous film. According to certain non-limiting exemplary embodiments of the invention, a monolithic film may act as a barrier to liquids and particulate matter but allow water vapor to pass through, such as by absorbing water vapor on one side of the film, transporting the water vapor through the film, and releasing the water vapor on the opposite side of the film. In addition, without intending to be bound by theory, by achieving and maintaining high breathability, it is possible to provide an article that is more comfortable to wear because the migration of water vapor through the laminate helps reduce and/or limit discomfort resulting from excess moisture trapped against the skin. Monolithic films, according to certain embodiments of the invention, may also act as barriers to bacteria and viruses and may provide an article or garment that reduces the contamination of the surroundings and the spread of infections and illness caused by the bacteria and viruses.

The term "highly breathable polymer", as used herein, may comprise any polymer that is selectively permeable to water vapor but substantially impermeable to liquid water and that can form a breathable film, for example, in which the polymer is capable of absorbing and desorbing water vapor and providing a barrier to aqueous fluids (e.g., water, blood, etc.). For example, a highly breathable polymer can absorb water vapor from one side of a film and release it to the other side of film, thereby allowing the water vapor to be transported through the film. As the highly breathable polymer can impart breathability to films, films formed from such polymers do not need to include pores (e.g., monolithic film). According to certain embodiments of the invention, "highly breathable polymer" may comprise any thermoplastic polymer having a MVTR of at least 500 g/m$^2$/day when formed into a film, such as a film having, for example, a thickness of about 25 microns or less. According to certain embodiments of the invention, "highly breathable polymer" may comprise any thermoplastic polymer having a MVTR of at least 750 g/m$^2$/day or of at least 1000 g/m$^2$/day when formed into a film, such as a film having, for example, a thickness of about 25 microns or less. According to certain embodiments of the invention, highly breathable polymers may comprise, for example, any one or combination of a polyether block amide copolymer (e.g., PEBAX® from Arkema Group), polyester block amide copolymer, copolyester thermoplastic elastomer (e.g., ARNITEL® from DSM Engineering Plastics, HYTREL® from E.I. DuPont de Nemours and Company), or thermoplastic urethane elastomer (TPU).

The term "non-breathable material", as used herein, may comprise any material that either does not allow water vapor to pass through the material or substantially impedes the movement of water vapor through the material. According to an embodiment of the invention, non-breathable materials may comprise a thermoplastic resin, such as polyethylene, polypropylene, polyester, polyamide, polyethylene vinyl acetate, polyvinyl chloride, or polyvinylidene chloride, or any copolymers or physical blends thereof. In other embodiments of the invention, the thermoplastic resin may comprise or even further comprise, for example, a low density polyethylene (LDPE), linear low density polyethylene (LLDPE), high density polyethylene (HIDPE), polypropylene (PP), copolymers or terpolymers of ethylene, or functionalized polymers of ethylene, or any coextrusion or blend thereof.

The term "laminate", as used herein, may be a structure comprising two or more layers, such as a film layer and a fibrous layer (e.g., a woven or nonwoven fabric). The two layers of a laminate structure may be joined together or releasably engaged to each other such that a substantial portion of their common X-Y plane interface, according to certain embodiments of the invention. In accordance with certain embodiments of the invention, two layers of a laminate structure may be releasably engaged to each other due, for example, to frictional forces, relative sizing, and/or relative positioning of the two layers.

The term "seal", as used herein, may comprise a thermal, adhesive, or mechanical bond formed in or with a material, for example, to provide a liquid impermeable seam including said seal. For example, a first portion of a material (e.g., a film, a nonwoven, or laminate) may be positioned over or adjacent to a second portion of the material and bonded together. In this regard, the seal may comprise, with respect to fabrics, the bringing together of at least a portion of the fibers of fabric into closer proximity or attachment therebetween (e.g., fused together) to form a bonding site or bonding sites. The bonding site or bonding sites, for example, may comprise a discrete or localized region of the material that has been softened or melted and optionally subsequently or simultaneously compressed to form a discrete or localized deformation in the material. In accordance with certain embodiments of the invention, the formation of a "seal" may be achieved by methods that apply, for example, heat and/or pressure to the material to be sealed (e.g., a film, a nonwoven, or laminate). One non-limiting method comprises thermal bonding. In accordance with certain embodiments, the "seal" may comprise a continuous bond formed, as opposed to a series of independent and discrete bond points, along a given length of material to be sealed.

All whole number end points disclosed herein that can create a smaller range within a given range disclosed herein are within the scope of certain embodiments of the invention. By way of example, a disclosure of from about 10 to about 15 includes the disclosure of intermediate ranges, for example, of: from about 10 to about 11; from about 10 to about 12; from about 13 to about 15; from about 14 to about 15; etc. Moreover, all single decimal (e.g., numbers reported to the nearest tenth) end points that can create a smaller range within a given range disclosed herein are within the scope of certain embodiments of the invention. By way of example, a disclosure of from about 1.5 to about 2.0 includes the disclosure of intermediate ranges, for example, of: from about 1.5 to about 1.6; from about 1.5 to about 1.7; from about 1.7 to about 1.8; etc.

I. Articles Exhibiting Barrier Properties

In one aspect, the invention provides articles (e.g., barrier laminates in the form of surgical gowns, sleeves, surgical drapes, pant legs, etc.) comprising an outer fabric layer and a laminate comprising at least a barrier film layer and an inner fabric layer, in which the outer fabric layer at least partially (e.g., completely or substantially completely) encircles and overlies the laminate. In accordance with certain embodiments of the invention, the laminate may comprise the barrier film layer adhesively glued to the inner fabric layer, thermally laminated to the inner fabric layer (e.g., ultrasonic bonds, point bonded, etc.), or extrusion coated onto the inner fabric layer. In accordance with certain embodiments of the invention the barrier film layer may be located either directly or indirectly between the outer fabric layer and the inner fabric layer. For example, the outer fabric layer may comprise a first side surface and a second side surface, in which the second side surface is located adjacent or proximate to the barrier film layer. In accordance with certain embodiments of the invention, for instance, articles may comprise a trilaminate including the barrier film layer directly adjacent to and sandwiched between both the outer fabric layer and the inner fabric layer. In accordance with certain embodiments of the invention, the barrier film layer may comprise a monolithic film or a porous film (e.g., including several micro-pores formed therein). The barrier film layer, in accordance with certain embodiments of the invention, may comprise a single layer film or a multilayer film.

Figure 1:
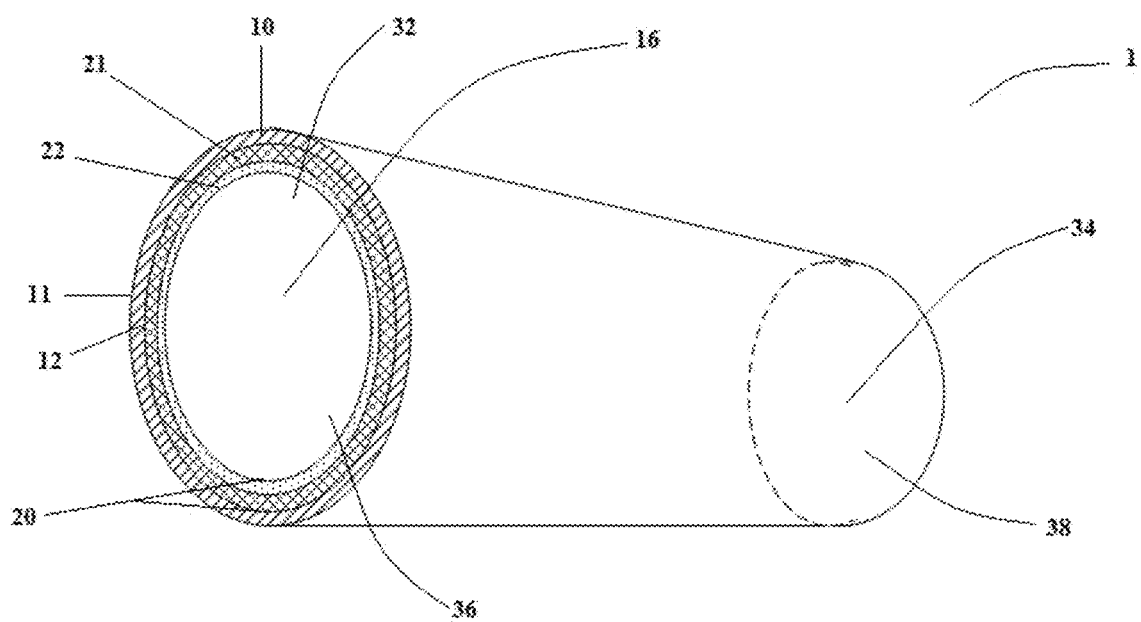
FIG. 1 illustrates an article comprising a trilaminate according to one embodiment of the invention.

As illustrated in FIG. 1, the article 1 includes an outer fabric layer 10 and a laminate 20 (e.g., a bilaminate) comprising a barrier film layer 21 and an inner fabric layer 22. As shown in FIG. 1, the outer fabric layer 10 encircles and overlies the laminate 20, in which the barrier film layer 21 is positioned between the outer fabric layer 10 and the inner fabric layer 22. The barrier film layer 21, as illustrated by the embodiment shown in FIG. 1, may be located directly between the outer fabric layer 10 and the inner fabric layer 22. In this regard, the outer fabric layer 10 comprises a first side surface 11 and a second side surface 12, in which the second side surface 12 is located adjacent to the barrier film layer 21.

In accordance with certain embodiments of the invention, the articles may be devoid of bonds (e.g., mechanical bonds, adhesive bonds, thermal bonds, etc.) between the outer fabric layer and the laminate. The outer fabric layer and the laminate, according to certain embodiments of the invention, may be held together (e.g., releasably together), for example, via frictional forces between the outer fabric layer and the laminate. The frictional forces between the outer fabric layer and the laminate may be increased or decreased by modifying the relative sizing (e.g., respective length, diameter, etc.) of the outer fabric layer and the laminate, and/or the relative positioning of the outer fabric layer and the laminate. In accordance with certain embodiments of the invention, the second side surface of the outer fabric layer may comprise a second surface coefficient of friction and the first side surface of the outer fabric layer comprises a first surface coefficient of friction, in which the second surface coefficient of friction is greater than the first surface coefficient of friction. In this regard, the second side surface of the outer fabric layer may be our have been subjected to a processing operation to render this side of the outer fabric layer more abrasive or capable of engaging the laminate to increase the second surface coefficient of friction.

As noted above, the barrier film layer, in accordance with certain embodiments of the invention, may comprise a monolithic film or a porous film (e.g., including several micro-pores formed therein). In accordance with certain embodiments of the invention, the barrier film layer may be made, at least in part, from polymers that are permeable to water vapor while being impermeable to aqueous liquids. In accordance with certain embodiments of the invention, for instance, the barrier film layer may comprise a monolithic film including at least one highly breathable polymer. According to certain embodiments of the invention, the highly breathable polymer may be hygroscopic. In certain embodiments of the invention, the barrier film layer (e.g., monolithic film) may comprise at least about 50 wt. % to about 100 wt. % (e.g., at least about 75 wt. % to about 100 wt. %) of a highly breathable polymer. As such, in certain embodiments, barrier film layer may comprise a monolithic film including at least one highly breathable polymer comprising from at least about any of the following: 50, 75, 80, and 100 wt. % (e.g., at least about 50 wt. % to about 100 wt. %).

In such embodiments, the highly breathable polymer may comprise at least one of a thermoplastic urethane (TPU), a polyether block amide copolymer (e.g., PEBAX® from Arkema Group or Vetsamid® E from Evonik), or a copolyester thermoplastic elastomer (e.g., ARNITEL® from DSM Engineering Plastics, HYTREL® from E.I. DuPont de Nemours and Company). In certain embodiments, for example, the highly breathable polymer may comprise a copolyester thermoplastic elastomer. In this regard, certain embodiments of the invention may comprise a monolithic barrier film layer comprising at least one highly breathable polymer.

In accordance with certain embodiments of the invention, the barrier film layer may optionally also comprise at least one non-breathable polymer. In some embodiments, for instance, the barrier film layer may comprise at most about 0 wt. % to at most about 50 wt. % of the non-breathable polymer. As such, in certain embodiments, the barrier film layer may comprise a non-breathable polymer comprising from at most about any of the following: 50, 40, 25, 20, 15, 10, 5 and 0 wt. % (e.g., at most about 0 wt. % to about 50 wt. %).

In accordance with certain embodiments of the invention, the barrier film layer may comprise a microporous film that comprises a pore structure configured to pass F1670 (synthetic blood barrier test) and F1671 (viral barrier test) testing. As noted previously, the barrier film layer may comprise a multilayer film including one or more individual monolithic film layers and one or more individual microporous film layers. For example, such a multilayer film may comprise an AB, ABA, ABABA structure (where 'A' represents an individual microporous film layer and 'B' represents an individual monolithic film layer, or vice versa), or the like, as long as the resulting multilayer film is breathable to moisture vapor and impervious to liquid, while also passing F1670 (synthetic blood barrier test) and F1671 (viral barrier test) testing.

In accordance with certain embodiments of the invention, the laminate may comprise a barrier film layer that optionally includes protrusions, such as small protrusions from particulate fillers incorporated into the barrier film layer, that engage the second side surface of the outer fabric layer to further increase the frictional forces between the outer fabric layer and the laminate. The barrier film layer, in accordance with certain embodiments of the invention, may comprise a multi-layer barrier film including a first outer film layer (e.g., a skin layer) comprising the plurality of protrusions formed by discrete filler particulates incorporated therein. In certain embodiments of the invention including such a multi-layer barrier film, the first outer film layer may be the only individual layer of the multi-layer barrier film including particulates therein. For example, the multi-layer barrier film may include a second layer comprising a highly breathable polymer forming a monolithic film layer, which is devoid of any particulates. In this regard, the monolithic film layer may provide the desired barrier properties as well as water vapor breathability while the first outer film layer (e.g., skin layer) simply provides increased frictional forces between the laminate and the outer fabric layer. In accordance with certain embodiments of the invention, the protrusions formed by discrete filler particulates, in which the filler particulates may comprise particulate inorganic materials such as, for example, calcium carbonate, various kinds of clay, silica, alumina, barium sulfate, sodium carbonate, talc, magnesium sulfate, titanium dioxide, zeolites, aluminum sulfate, cellulose-type powders, diatomaceous earth, magnesium sulfate, magnesium carbonate, barium carbonate, kaolin, mica, carbon, calcium oxide, magnesium oxide, aluminum hydroxide, glass particles, and the like. In this regard, the filler particulates may define the plurality of protrusions extending outwardly from the barrier layer film (e.g., a skin layer of a multi-layer barrier film).

In accordance with certain embodiments of the invention, the outer fabric layer comprises a nonwoven fabric or a woven fabric. In accordance with certain embodiments of the invention, the outer fabric layer may naturally or otherwise rendered hydrophobic by one or more additives. In this regard, the outer fabric layer may be or rendered non-absorbent (e.g., repels or at least does not attract polar liquids such as water). In accordance with certain embodiments of the invention, for example, the outer fabric layer may be water and alcohol repellent. The inner fabric layer, according to certain embodiments of the invention, may comprise a nonwoven fabric or a woven fabric, which may be either hydrophobic or hydrophilic. In accordance with certain embodiments of the invention, both the outer fabric layer and the inner fabric layer comprise a nonwoven fabric. Each of the outer fabric layer and the inner fabric layer may independently include continuous fibers, staple fibers, or both. The nonwoven fabric of the outer fabric layer and/or the inner fabric layer may comprise one or more individual nonwoven web layers. In this regard, the nonwoven fabric of the outer fabric layer and/or the inner fabric layer may comprise spunbond nonwovens, meltblown nonwovens, hydroentangled nonwovens, air-laid nonwovens, bonded carded nonwovens, or any combination thereof. For example, the outer fabric layer and/or the inner fabric layer may comprise a spunbond nonwoven or a spunbond-meltblown-spunbond (SMS) nonwoven. In accordance with certain embodiments of the invention, the outer fabric layer and/or the inner fabric layer may comprise one or more polymeric materials. For example, the nonwoven fabric of the outer fabric layer and/or the inner fabric layer may comprise filaments comprising a polypropylene, polyethylene, or both. In certain embodiments of the invention, for instance, the polymeric material may comprise high density polypropylene or high density polyethylene, low density polypropylene or low density polyethylene, linear low density polypropylene or linear low density polyethylene, a copolymer of polypropylene or ethylene, and any combination thereof. In certain embodiments of the invention, for instance, the polymeric material may comprise polypropylene of one or more different forms, such as a homopolymer, a random copolymer, a polypropylene made with a Ziegler-Natta or metallocene or other catalyst system. The polypropylene may be provided in a variety of configurations including isotactic, syndiotactic, and atactic configurations of polypropylene. In some embodiments of the invention, the polymeric material may comprise at least one of a polypropylene, a polyethylene, a polyester, a polyamide, or combinations thereof. In accordance with certain embodiments of the invention, the polymeric material may comprise a biopolymer (e.g., polylactic acid (PLA), polyhydroxyalkanoates (PHA), and poly(hydroxycarboxylic) acids). In accordance with certain embodiments of the invention, the nonwoven fabric of the outer fabric layer and/or the inner fabric layer may comprise multicomponent fibers, such as bicomponent fibers having a sheath-core configuration. For example, certain embodiments of the invention may comprise bicomponent fibers comprising a sheath comprising, by way of example only, a polyethylene or a propylene and a core comprising, by way of example only, at least one of a polypropylene, a polyethylene, a polyester, or a biopolymer (e.g., polylactic acid (PLA) polyhydroxyalkanoates (PHA), and poly(hydroxycarboxylic) acids. The outer fabric layer and/or the inner fabric layer my comprise filaments or fibers comprising a round cross-section, non-round cross section (e.g., ribbon shaped, trilobal shaped, etc.), or combinations thereof. In accordance with certain embodiments of the invention, the outer fabric layer and/or the inner fabric layer may be untreated or treated with one or more additives, such as a repellent and an antistatic finish.

In accordance with certain embodiments of the invention, the outer fabric layer and/or the inner fabric layer my comprise a repellent composition disposed thereon. In accordance with certain embodiment of the invention, the repellent composition may be disposed and/or applied via topical and/or internal treatment of the fiber(s) of the outer fabric layer and/or the inner fabric layer. For example, the repellent composition may comprise a material or materials that repel a liquid, such as water and/or blood. In this regard, the repellent composition may comprise a hydrophobic additive. In accordance with certain embodiments of the invention, the repellent composition may be provided at an amount sufficient to exhibit at least the necessary level of alcohol repellency for surgical applications. In this regard, the outer fabric layer and/or the inner fabric layer may comprise a topically treated fabric comprising a desired alcohol repellency. In accordance with certain embodiments, the repellent composition may comprise at least one fluorochemical. For example, the at least one fluorochemical may comprise at least one of a C4 fluorochemical, a C6 fluorochemical, a C8 fluorochemical, a C10 fluorochemical, or any combination thereof.

The outer fabric layer, in accordance with certain embodiments of the invention, may comprise an outer fabric layer seal (e.g., the outer fabric layer being sealed to itself at an outer fabric layer seam) formed between a first outer fabric layer side and a second outer fabric layer side to provide a hollow outer fabric layer structure defining an outer fabric layer conduit. The outer fabric layer seal may comprise a heat or thermal seal, adhesive seal, ultrasonic seal, mechanical seal, or any combinations thereof. The laminate, in accordance with certain embodiments of the invention, may comprise a laminate seal (e.g., the laminate being sealed to itself at a laminate seam), which is separate and distinct from the outer fabric layer seal, formed between a first laminate side and a second laminate side to define a hollow laminate structure defining a laminate conduit. In accordance with certain embodiments of the invention, the laminate seal may comprise a core defined by the barrier film layer of, for example, the first laminate side being melted and fused to the barrier film layer of, for example, the second laminate side. In this regard, the fibers of the inner fabric layer of the laminate melt and fuse to the core of the laminate seal. The laminate seal may comprise a heat or thermal seal, adhesive seal, ultrasonic seal, mechanical seal, or any combinations thereof. In this regard, certain embodiments of the invention may comprise two separate and distinct seals, while the outer fabric layer and the laminate (e.g., bilaminate encircled by the outer fabric layer) are not bonded to each other (e.g., devoid of bonds therebetween).

Figure 2A:
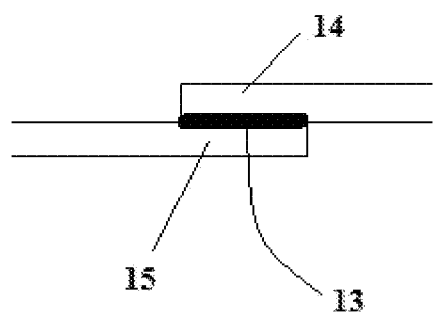
FIG. 2A illustrates a configuration of an outer fabric layer seal according to one embodiment of the invention.
Figure 2B:
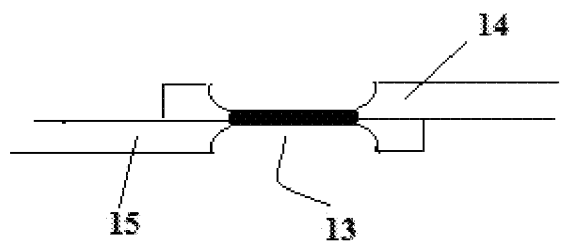
FIG. 2B illustrates a configuration of an outer fabric layer seal according to one embodiment of the invention.
Figure 2C:
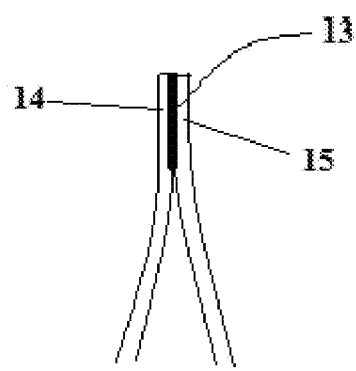
FIG. 2C illustrates another configuration of an outer fabric layer seal according to one embodiment of the invention.
Figure 2D:
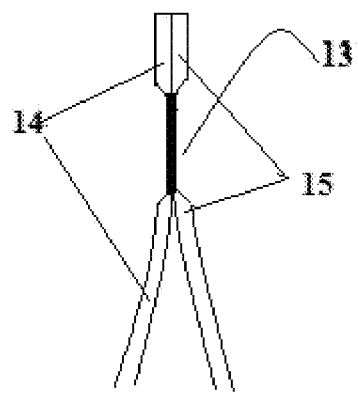
FIG. 2D illustrates another configuration of an outer fabric layer seal according to one embodiment of the invention.
Figure 2E:
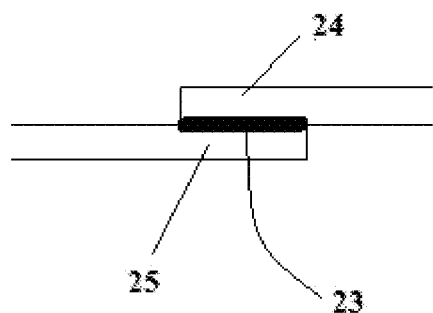
FIG. 2E illustrates a configuration of a laminate seal according to one embodiment of the invention.
Figure 2F:
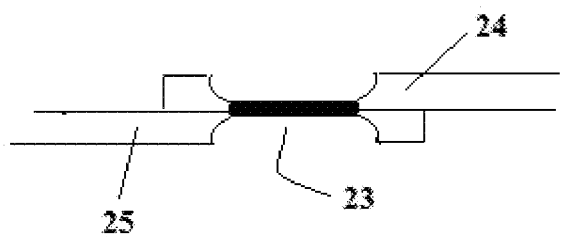
FIG. 2F illustrates a configuration of a laminate seal according to one embodiment of the invention
Figure 2G:
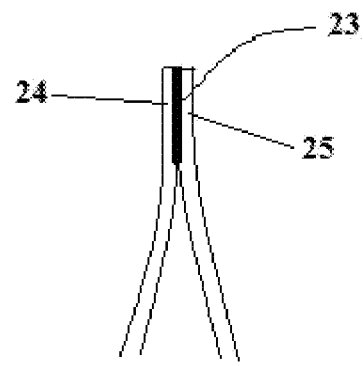
FIG. 2G illustrates another configuration of a laminate seal according to one embodiment of the invention.
Figure 2H:
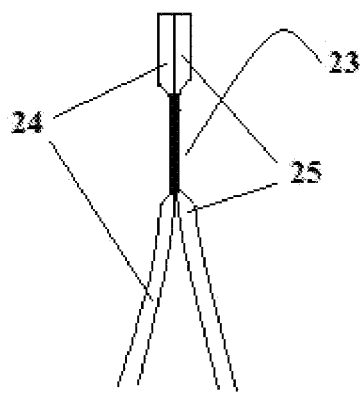
FIG. 2H illustrates another configuration of a laminate seal according to one embodiment of the invention

As shown, for example, in FIGS. 2A-2D, the outer fabric layer seal 13 may be located and/or formed between a first outer fabric layer side 14 and a second outer fabric layer side 15. FIGS. 2B and 2D illustrate embodiments in which the outer fabric layer seal 13 comprises a localized discrete or localized deformation region, for example, via the softening and/or melting and compression to form the discrete or localized deformation. FIG. 4A provides a better illustration of the pre-bonding/pre-sealing orientation of the first outer fabric layer side 14 and the second outer fabric layer side 15. FIGS. 2A-2D illustrate embodiments in which the outer fabric layer is bonded to itself at the outer fabric layer seal 13. As shown in FIGS. 2A and 2B, a first side-surface of the first outer fabric layer side 14 may be bonded to a second side-surface (being opposite of the first side-surface) of the second outer fabric layer side 15. As shown in FIGS. 2C and 2D, a first side-surface of the first outer fabric layer side 14 may be bonded to the same side-surface of the second outer fabric layer side 15. FIGS. 2E-2H show that the laminate seal 23 may be located and/or formed between a first laminate side 24 and a second laminate side 25. FIGS. 2E-2H illustrate embodiments in which the laminate is bonded to itself at the laminate seal 23. FIGS. 2F and 2H illustrate embodiments in which the laminate seal 13 comprises a localized discrete or localized deformation region, for example, via the softening and/or melting and compression to form the discrete or localized deformation. As shown in FIGS. 2E and 2F, a first side-surface of the first laminate side 24 may be bonded to a second side-surface (being opposite of the first side-surface) of the second laminate side 25 (e.g., a film-nonwoven-nonwoven-film seal structure). As shown in FIGS. 2G and 2H, a first side-surface of the first laminate side 24 may be bonded to the same side-surface of the second laminate side 25. As illustrated in FIGS. 2G and 2H, for example, the laminate seal 13 may be formed by directly bonding (e.g., thermally bonding) the barrier film layer of the laminate to itself (e.g., same side-surface of the laminate). The laminate seal, in according with such embodiments of the invention, comprises a nonwoven-film-film-nonwoven structure by directly bonding (e.g., thermally bonding) the barrier film layer of the laminate to itself. A laminate seal having the nonwoven-film-film-nonwoven structure eliminates the presence of a fabric layer between the portions of the barrier film layer bonded to each other to provide a laminate seal exhibiting improved liquid impermeability. FIG. 5A provides a better illustration of the pre-bonding/pre-sealing orientation of the first laminate side 24 and the second laminate side 25. Although FIGS. 2A-2H illustrate a cross-sectional view of seals 13, 23, it should be understood that the seals 13, 23, in according to certain embodiments of the invention, may extend continuously along the length (e.g., in and/or out of the plane of the paper) of the respective material (e.g., outer fabric layer 10 and laminate 20). The outer fabric layer seal 13, according to certain embodiments of the invention, may not be continuous but instead comprise one or more discrete bond locations.

As shown in FIG. 1, the sealing (e.g., bonding via outer fabric layer seal 13) provides a hollow outer fabric layer structure defining an outer fabric layer conduit 16 extending from a first outer fabric layer end 17 (as best shown in FIG. 4A) to a second outer fabric layer end 18 (as best shown in FIG. 4A). Although not shown in FIG. 1, the outer fabric layer seal 13 may extend continuously from the first outer fabric layer end 17 to the second outer fabric layer end 18. In this regard, the first outer fabric layer end 17 defines a first opening 32 and the second outer fabric layer end defines a second opening 34. In the embodiment illustrated in FIG. 1, the first opening 32 may be larger than the second opening 34. The hollow outer fabric layer structure may comprise a variety of configurations, such as a cylindrical configuration, a truncated cone configuration, or a truncated triangular configuration.

As shown in FIG. 1, the sealing (e.g., bonding via outer fabric layer seal 23) provides a hollow laminate structure defining a laminate conduit extending from a first laminate end 27 (as best shown in FIG. 5A) to a second laminate end 28 (as best shown in FIG. 5A). Although not shown in FIG. 1, the laminate seal 23 may extend continuously from the first laminate end 27 to the second laminate end 28. In this regard, the first laminate end 27 defines a first laminate opening 36 and the second laminate end defines a second laminate opening 38. The embodiment illustrated in FIG. 1, the first laminate opening 36 may be larger than the second laminate opening 38. The hollow laminate structure may comprise a variety of configurations, such as a cylindrical configuration, a truncated cone configuration, or a truncated triangular configuration. As shown in FIG. 1, the barrier film layer 21 is located between the outer fabric layer 10 and the inner fabric layer 22. As also shown in FIG. 1, the hollow outer fabric layer structure and the hollow laminate structure may be concentrically located with respect to each other.

In accordance with certain embodiments of the invention, the outer fabric layer 10 comprises a non-sealed geometric shape, such as shown in FIG. 4A. The outer fabric layer 10 also comprises a non-sealed outer fabric layer length from the first outer fabric layer end 17 and the second outer fabric layer end 18 and a non-sealed outer fabric layer width from the first outer fabric layer side 14 the second outer fabric layer side 15, such as shown in FIG. 4A. Similarly, the laminate 10 comprises a non-sealed laminate geometric shape, such as shown in FIG. 5A. The laminate 10 also comprises a non-sealed laminate length from the first laminate end 27 and the second laminate end 28 and a non-sealed laminate width from the first laminate side 24 the second laminate side 25, such as shown in FIG. 5A. As illustrated by FIGS. 4A and 5A, the non-sealed geometric shape and the non-sealed laminate geometric shape are the same or substantially the same. In accordance with certain embodiments of the invention, the outer fabric layer 10 includes an outer fabric layer 2D surface area is the same or different than a laminate 2D surface area. In accordance with certain embodiments of the invention, the outer fabric layer 2D surface area is less than the laminate 2D surface area. The non-sealed outer fabric layer length, according to certain embodiments of the invention, may comprise the same (or substantially the same) as the non-sealed laminate length.

As illustrated by FIG. 4A, the non-sealed outer fabric layer width varies according to a defined profile from a first outer fabric layer width W1 (FIG. 4A) to a second outer fabric layer width W2 (FIG. 4A) along the non-sealed outer fabric length. The non-sealed laminate width also varies according to the defined profile from a first laminate width WL1 (FIG. 5A) to a second laminate width WL2 (FIG. 5A) along the non-sealed laminate length. In accordance with certain embodiments of the invention, the non-sealed outer fabric layer width is the same or smaller than the non-sealed laminate width along corresponding points along an article length. In this regard, the non-sealed outer fabric layer width may comprise at least about 0.1 mm shorter than the non-sealed laminate width in at least one corresponding point along an article length (or the entire length of the article). In accordance with certain embodiments of the invention, the non-sealed outer fabric layer width may comprise from at least about any of the following: 0.1, 0.5, 1, 1.5, 2.0, 5 and 10 mm shorter than the non-sealed laminate width in at least one corresponding point along an article length (or the entire length of the article) and/or at most about 20, 15, 10, and 5% mm shorter than the non-sealed laminate width in at least one corresponding point along an article length (or the entire length of the article) (e.g., about 0.5-10 mm, about 1 to about 2 mm).

In accordance with certain embodiments of the invention, the outer fabric layer seal comprises an outer fabric layer seal elongation and the laminate seal comprises a laminate seal elongation, in which the outer fabric layer seal elongation is equal to or less than the laminate seal elongation when subjected to the same tensile force. In certain embodiments, for example, the outer fabric layer seal elongation is from about 1 to about 15% (e.g., about 5 to about 10%) less than the laminate seal elongation. In accordance with certain embodiments of the invention, the outer fabric layer seal elongation may comprise from at least about any of the following: 1, 2, 3, 4, 5, and 10% less than the laminate seal elongation and/or at most about 20, 15, 10, and 5% less than the laminate seal elongation (e.g., about 5 to about 10%, about 3 to about 20%, etc.).

In accordance with certain embodiments of the invention, the outer fabric layer seal comprises an outer fabric layer seal tensile strength from about 5 to about 25% (e.g., from about 10 to about 25%) stronger than a laminate seal tensile strength. In accordance with certain embodiments of the invention, the outer fabric layer comprises an outer fabric layer seal tensile strength from at least about any of the following: 5, 8, 10, 12, 15, 18, and 20% greater than a laminate seal tensile strength and/or at most about 30, 25, 20, and 15% greater than a laminate seal tensile strength (e.g., about 10 to about 25%, about 15 to about 25%, etc.).

In accordance with certain embodiments of the invention, the hollow outer fabric layer structure (e.g., a sleeve or tube structure) may comprise a hollow outer fabric layer perimeter and the hollow laminate structure (e.g., a sleeve or tube structure) may comprise a hollow laminate perimeter, in which the hollow outer fabric layer perimeter is equal to or smaller than the hollow laminate perimeter when both are in a relaxed and/or non-stretched state. For example, the hollow outer fabric layer perimeter may comprise from at least about any of the following: 0.1, 0.5, 1, 1.5, 2.0, 5 and 10 mm shorter than the hollow laminate perimeter in at least one corresponding point along the article length (or the entire length of the article) in a relaxed and/or non-stretched state and/or at most about 20, 15, 10, and 5% mm shorter than the hollow laminate perimeter in at least one corresponding point along an article length in a relaxed and/or non-stretched state (or the entire length of the article) (e.g., about 0.5-10 mm, about 1 to about 2 mm). As noted above, the outer fabric layer seal (formed from bonding a fabric layer to itself) may comprise a stronger seal, as evident by a larger tensile strength, than the laminate seal. By having the hollow outer fabric layer perimeter smaller than the hollow laminate perimeter, according to certain embodiments of the invention, an initial load applied to the article (e.g., such as a force exerted by a user's bending elbow exerting force on the article) will be handled by the stronger outer fabric layer seal (e.g., the outer fabric layer seal tensile strength comprising a value greater than the laminate seal tensile strength as discussed above).

In accordance with certain embodiments of the invention, articles (e.g., a trilaminate) may comprise a basis weight from about 25 to about 85 grams-per-square-meter (gsm). Articles, in accordance with certain embodiments of the invention, may comprise a basis weight from at least about any of the following: 25, 30, 35, 40, 45, and 50 gsm and/or at most about 100, 85, 80, 75, 70, 65, 60, 55, and 50 gsm (e.g., about 35 to about 80 gsm, about 50 to about 80 gsm, etc.). The barrier film layer, in accordance with certain embodiments of the invention, may comprise from about 5 to about 50% by weight of the article (e.g., a trilaminate). In accordance with certain embodiments of the invention, barrier film layer may comprise from at least about any of the following: 5, 8, 10, 12, 15, 20, and 25% by weight of the article and/or at most about 50, 45, 40, 35, 30, and 25% by weight of the article (e.g., about 10 to about 30% by weight of the article, about 20 to about 25% by weight of the article, etc.).

In accordance with certain embodiments of the invention, the articles comprise barrier laminates (e.g., liquid barrier protection while also providing breathability) in the form of surgical gowns, sleeves, surgical drapes, pant legs, a shoe cover, a head-piece, or facemask.

In this regard, the articles in accordance with certain embodiments of the invention may provide a user the perception of a softer feel in comparison to traditional articles suitable for AAMI 4-rated barrier laminates. While not wishing to be bound by the following theory, it believed that the increased perception of softness by a user (e.g., a wearer) may be attributed to one or more of the following: notably less glue (or devoid of glue) present between the individual layers of the articles, and the increased range of motion of the outer fabric layer and the laminate relative to each other (e.g., except where sewn or bonded onto the body of a gown or a cuff, the outer fabric layer and the laminate may be generally free to slide past each other). In this regard, articles according to certain embodiments of the invention bend more freely than traditional articles suitable for AAMI 4-rated barrier laminates. This increased level in ease of bending realized by a user may translate into an increased perception of softness as well as providing an overall more comfortable structure for wearing by a user.

II. Methods of Producing a Nonwoven Fabric

Figure 3:
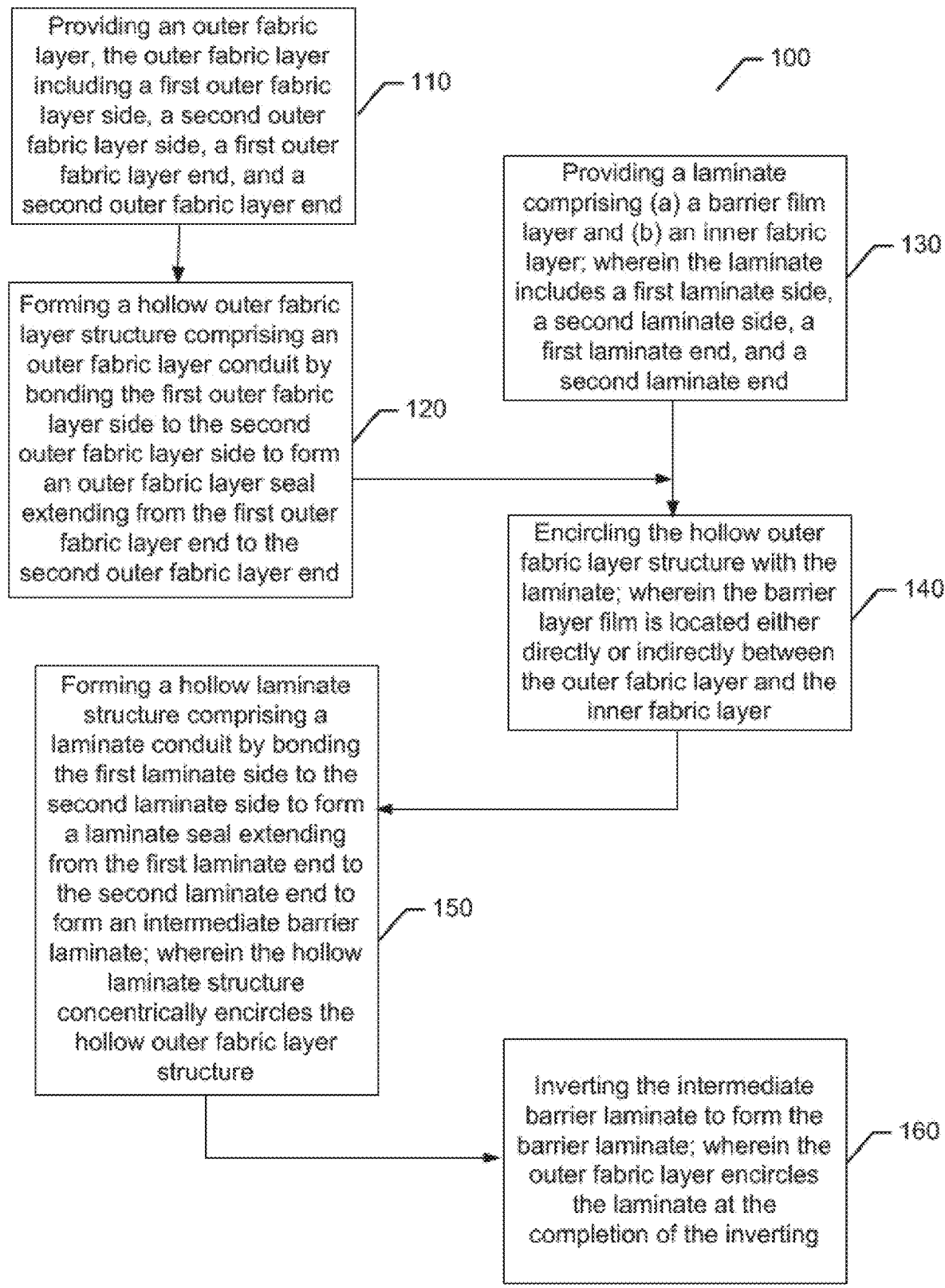
FIG. 3 illustrates a process flow diagram for making a barrier laminate according to an example embodiment of the invention.

In yet another aspect, the invention provides a method of making barrier laminates (and articles comprising such barrier laminates). Methods, in accordance with certain embodiments of the invention and as shown in FIG. 3, comprise a step of providing an outer fabric layer, in which the outer fabric layer includes a first outer fabric layer side, a second outer fabric layer side, a first outer fabric layer end, and a second outer fabric layer end at operation 110. The methods may also comprise a step of forming a hollow outer fabric layer structure comprising an outer fabric layer conduit by bonding the first outer fabric layer side to the second outer fabric layer side to form an outer fabric layer seal extending from the first outer fabric layer end to the second outer fabric layer end at operation 120. The methods may also comprise a step of providing a laminate including a barrier film layer and an inner fabric layer, in which the laminate includes a first laminate side, a second laminate side, a first laminate end, and a second laminate end at operation 130. In accordance with certain embodiments of the invention, the methods may comprise encircling the hollow outer fabric layer structure with the laminate, in which the barrier layer film is located either directly or indirectly between the outer fabric layer and the inner fabric layer at operation 140. The methods may also comprise a step of forming a hollow laminate structure comprising a laminate conduit by bonding the first laminate side to the second laminate side to form a laminate seal extending from the first laminate end to the second laminate end to form an intermediate barrier laminate, in which the hollow laminate structure encircles (e.g., concentrically encircles) the hollow outer fabric layer structure at operation 150. In this regard, certain embodiments of the invention may comprise separately forming the hollow outer fabric layer structure (e.g., a sleeve or tube structure) and the hollow laminate structure (e.g., a sleeve or tube structure) followed by inserting the hollow outer fabric layer structure inside the hollow laminate structure such that the hollow outer fabric layer structure is encircled by the hollow laminate structure to form the intermediate barrier laminate. Methods, in accordance with certain embodiments of the invention, may comprise a step of inverting the intermediate barrier laminate (e.g., turning the intermediate barrier laminate inside-out) to form the barrier laminate, in which the outer fabric layer encircles the laminate at the completion of the inverting step at operation 160. In accordance with certain embodiments of the invention, the inverting step hides the outer fabric layer seal on the inside of the assembled barrier laminate.

In accordance with certain embodiments of the invention, the step of inverting the intermediate barrier laminate to form the barrier laminate comprises pulling the second outer fabric layer end and the second laminate end through the outer fabric layer conduit and through the first laminate end or pulling the first outer fabric layer end and the first laminate end through the outer fabric layer conduit and through the second laminate end. In this regard, methods according to certain embodiments of the invention comprise turning the intermediate barrier laminate inside-out such that the outer fabric layer overlies and encircles, at least a portion, of the laminate with the film barrier layer being located directly or indirectly between the outer fabric layer and the inner fabric layer.

Methods according to certain embodiments of the invention may be devoid of any active or passive steps of forming bonds (e.g., physical, adhesive, thermal) between the outer fabric layer and the laminate. In this regard, articles (e.g., barrier laminates) formed according to certain embodiments of the invention may be devoid of bonds between the outer fabric layer and the laminate. In this regard, the outer fabric layer and the laminate may be releasably engaged or attached to each other due to frictional forces between the two materials as discussed previously.

As discussed previously, the barrier film may comprise a monolithic film or a porous film and the outer fabric layer, as well as the inner fabric layer, may comprise a woven or nonwoven. In certain embodiments of the invention, the resulting barrier laminate comprises a trilaminate including a nonwoven outer fabric layer, a monolithic barrier film layer, and a nonwoven inner fabric layer.

In accordance with certain embodiments of the invention, the step of bonding the first outer fabric layer side to the second outer fabric layer side to form the outer fabric layer seal may comprise performing a thermal bonding operation, an adhesive bonding operation, an ultrasonic bonding operation, a mechanical bonding, or any combinations thereof. The step of bonding the first laminate side to the second laminate side to form the laminate seal may comprise performing a thermal bonding operation, an adhesive bonding operation, an ultrasonic bonding operation, a mechanical bonding, or any combinations thereof. In accordance with certain embodiments of the invention, the laminate seal may be formed by directly bonding (e.g., thermally bonding) the barrier film layer to itself. The laminate seal, in according with such embodiments of the invention, comprises a nonwoven-film-film-nonwoven structure by directly bonding (e.g., thermally bonding) the barrier film layer of the laminate to itself. A laminate seal having the nonwoven-film-film-nonwoven structure eliminates the presence of a fabric layer between the portions of the barrier film layer bonded to each other to provide a laminate seal exhibiting improved liquid impermeability. In accordance with certain embodiments, the step of bonding the first laminate side to the second laminate side to form the laminate seal comprises performing a thermal bonding operation (e.g., heat sealing). In accordance with certain embodiments of the invention, for example, the outer fabric layer seal and/or the laminate seal may be independently formed by thermal impulse sealing (e.g., the material to be seamed together via seal formation are captured between sealing elements that apply heat and pressure), ultrasonic sealing, extrusion of a hot melt (or other adhesive) between the two surfaces of the material to be bonded together followed by a pressure mechanism that press both surfaces of the material against the hot melt.

FIGS. 4A-4C each illustrate individual steps in a method of making a barrier laminate according to an example embodiment of the invention. FIG. 4A, for instance, illustrates the cutting of an outer fabric layer 10 into a outer fabric layer geometric shape including a first outer fabric layer side 14, a second outer fabric layer side 15, a first outer fabric layer end 17, and a second outer fabric layer end 18. FIG. 4A includes a dashed line illustrating a centerline through the length of the outer fabric layer. The geometric shape of the outer fabric layer includes a first outer fabric layer end 17 that is greater than the second outer fabric layer end 18. That is, the width of the first outer fabric layer end W1 is greater than the width of the second outer fabric layer end W2. Although FIG. 4A illustrates the first outer fabric layer end 17 being greater than the second outer fabric layer end 18 (e.g., W1 being greater than W2), certain embodiments according to the invention may comprise the first outer fabric layer end 17 being equal to the second outer fabric layer end 18 (e.g., W1 being equal to W2). FIG. 4B illustrates an embodiment in which the outer fabric layer 10 from FIG. 4A is folded in half and onto itself. Subsequently, the outer fabric layer 10 can be sealed (e.g., bonded to form outer fabric layer seal 13) as shown in FIG. 4C. The outer fabric layer seal 13, as shown in FIG. 4C, extends along the entire length of the outer fabric layer (e.g., from the first outer fabric layer end 17 to the second outer fabric layer end 18). The outer fabric seal 13, according to certain embodiments, may comprise one or more discrete bond points along a portion or the entirety of the length of the outer fabric layer or instead a continuous bonded seal.

FIGS. 5A-5C each illustrate individual steps, performed (for example) after steps illustrated in FIGS. 4A-4C, in a method of making a barrier laminate according to an example embodiment of the invention. For example, FIG. 5A illustrates the cutting of a laminate 20 into a laminate geometric shape including a first laminate side 24, a second laminate side 25, a first laminate end 27, and a second outer fabric layer end 28. FIG. 5A includes a dashed line illustrating a centerline through the length of the laminate 20. The geometric shape of the laminate 20 is the same (or substantially the same) as the outer fabric layer geometric shape of the outer fabric layer 10. In accordance with certain embodiments of the invention, the method may also include a step of placing the outer fabric layer 10 on top of the laminate 20 and aligning the first outer fabric layer end with the first laminate end, the second outer fabric layer end with the second laminate end, or both. The laminate geometric shape of the laminate includes a first laminate end 27 that is greater than the second laminate end 28. That is, the width of the first laminate end WL1 is greater than the width of the second laminate end WL2. Although FIG. 5A illustrates the first laminate end 27 being greater than the second laminate end 28 (e.g., WL1 being greater than WL2), certain embodiments according to the invention may comprise the first laminate end 27 being equal to the second laminate end 28 (e.g., WL1 being equal to WL2). Although the geometric shapes of the outer fabric layer 10 and the laminate 20 may be the same (or substantially similar), W1 may be slightly larger than WL1 and/or W2 may be slightly larger than WL2, as discussed herein. FIG. 5A also illustrates the positioning of the outer fabric layer 10 in a folded and sealed state positioned over the top of an upper-half portion of the non-sealed laminate 20. In certain embodiments, the portion of the outer fabric layer 10 including the outer fabric layer seal 13 may be bent over and placed on top of laminate 20 (in a non-sealed state), in which bending over the portion of the outer fabric layer 10 including the outer fabric layer seal 13 may be performed to prevent it from being caught in the subsequently formed laminate seal 23, according to this particular example embodiment. FIG. 5B illustrates an embodiment in which the laminate 20 is folded in half and onto itself, while encircling the outer fabric layer 10. Subsequently, the laminate 20 can be sealed (e.g., bonded to form laminate seal 23) as shown in FIG. 5C. The laminate seal 23, as shown in FIG. 5C, comprises a continuous seal that extends continuously along the entire length of the outer fabric layer (e.g., from the first laminate end 27 to the second laminate end 28). As shown in FIG. 5C, the outer fabric layer is completely encircled by the laminate 10 to form an intermediate barrier laminate 50.

FIG. 6A illustrates a step of inverting the intermediate barrier laminate 50 formed in FIG. 5C. In this regard, the step of inverting the intermediate barrier laminate 50 comprises turning the intermediate barrier laminate 50 inside-out to form the barrier laminate 1, in which the outer fabric layer 10 encircles the laminate 20 at the completion of the inverting step such that the inner fabric layer comprises the inner most side of the barrier laminate 1 and the outer fabric layer 10 is the outermost side of the barrier laminate 1 as shown in FIG. 6B. In accordance with certain embodiments of the invention, the step of inverting the intermediate barrier laminate 50 to form the barrier laminate 1 comprises pulling the second outer fabric layer end 18 and the second laminate end 28 through the outer fabric layer conduit 16 and through the first laminate end 27 (as illustrated by the arrow on FIG. 6A) or pulling the first outer fabric layer end 17 and the first laminate end 27 through the outer fabric layer conduit 16 and through the first laminate end 28. In this regard, methods according to certain embodiments of the invention comprise turning the intermediate barrier laminate 50 inside-out such that the outer fabric layer 10 overlies and encircles, at least a portion, of the laminate 20 with the film barrier layer 21 being located directly or indirectly between the outer fabric layer 10 and the inner fabric layer 22.

As noted above, the outer fabric layer geometric shape and the laminate geometric shape may be the same or substantially the same, but the outer fabric layer may comprise a 2D surface area that is the same or different than a laminate 2D surface area, for example, when each is in the non-sealed and/or relaxed state. In certain embodiments, for example, the outer fabric layer 2D surface area is less than the laminate 2D surface area, for example, when each is in the non-sealed and/or relaxed state. In this regard, the outer fabric layer in the non-sealed and/or relaxed state may comprise the same length as the laminate in the non-sealed and/or relaxed state. In this regard, the outer fabric layer comprises an outer fabric layer length from the first outer fabric layer end and the second outer fabric layer end and an outer fabric layer width from the first outer fabric layer side the second outer fabric layer side. The laminate may comprise a laminate length from the first laminate end and the second laminate end and a laminate width from the first laminate side the second laminate side, in which the outer fabric layer length is the same as the laminate length first outer fabric layer end.

In accordance with certain embodiments of the invention, the method may comprise forming the hollow outer fabric layer structure (e.g., a sleeve or tube structure), in which the formed hollow outer fabric structure comprises a hollow outer fabric layer perimeter, and forming the hollow laminate structure (e.g., a sleeve or tube structure), in which the formed hollow laminate structure comprises a hollow laminate perimeter, in which the hollow outer fabric layer perimeter is equal to or smaller than the hollow laminate perimeter when both are in a relaxed and/or non-stretched state. For example, the hollow outer fabric layer perimeter may comprise from at least about any of the following: 0.1, 0.5, 1, 1.5, 2.0, 5 and 10 mm shorter than the hollow laminate perimeter in at least one corresponding point along the article length (or the entire length of the article) in a relaxed and/or non-stretched state and/or at most about 20, 15, 10, and 5% mm shorter than the hollow laminate perimeter in at least one corresponding point along an article length in a relaxed and/or non-stretched state (or the entire length of the article) (e.g., about 0.5-10 mm, about 1 to about 2 mm). As noted above, the outer fabric layer seal (formed from bonding a fabric layer to itself) may comprise a stronger seal, as evident by a larger tensile strength, than the laminate seal. By having the hollow outer fabric layer perimeter smaller than the hollow laminate perimeter (in a relaxed and/or non-stretched state), according to certain embodiments of the invention, an initial load applied to the article (e.g., such as a force exerted by a user's bending elbow exerting force on the article) will be handled by the stronger outer fabric layer seal (e.g., the outer fabric layer seal tensile strength comprising a value greater than the laminate seal tensile strength as discussed above).

In accordance with certain embodiments of the invention, the outer fabric layer width varies according to a defined profile from a first outer fabric layer width (e.g., W1 in FIG. 4A) to a second outer fabric layer width (e.g., W2 in FIG. 4A) along the outer fabric length. The laminate width may also vary according to the defined profile from the first laminate width (e.g., WL1 in FIG. 5A) to a second laminate width (e.g., WL2 in FIG. 5A) along the laminate length. The outer fabric layer width may be the same or smaller than the laminate width along corresponding points when the first outer fabric layer end is aligned with the first laminate end, the second outer fabric layer end is aligned with the second laminate end, or both.

In accordance with certain embodiments of the invention, the outer fabric layer seal comprises an outer fabric layer seal elongation and the laminate seal comprises a laminate seal elongation, in which the outer fabric layer seal elongation is equal to or less than the laminate seal elongation when subjected to the same tensile force. In certain embodiments, for example, the outer fabric layer seal elongation is from about 1 to about 15% (e.g., about 5 to about 10%) less than the laminate seal elongation. In accordance with certain embodiments of the invention, the outer fabric layer seal elongation may comprise from at least about any of the following: 1, 2, 3, 4, 5, and 10% less than the laminate seal elongation and/or at most about 20, 15, 10, and 5% less than the laminate seal elongation (e.g., about 5 to about 10%, about 3 to about 20%, etc.).

In accordance with certain embodiments of the invention, the outer fabric layer seal comprises an outer fabric layer seal tensile strength from about 5 to about 25% (e.g., from about 10 to about 25%) stronger than a laminate seal tensile strength. In accordance with certain embodiments of the invention, the outer fabric layer comprises an outer fabric layer seal tensile strength from at least about any of the following: 5, 8, 10, 12, 15, 18, and 20% greater than a laminate seal tensile strength and/or at most about 30, 25, 20, and 15% greater than a laminate seal tensile strength (e.g., about 10 to about 25%, about 15 to about 25%, etc.).

Methods, in accordance with certain embodiments of the invention, comprise forming a wearable article from the barrier laminate. Wearable articles according to certain embodiments may comprise a surgical gown, a surgical drape, a sleeve, a pant leg, a shoe cover, a head-piece, a facemask, or a bodysuit.

III. Examples

The present disclosure is further illustrated by the following examples, which in no way should be construed as being limiting. That is, the specific features described in the following examples are merely illustrative and not limiting.

Test Methods

Key properties to characterize seal (e.g., a seam including a seal) include, but are not necessarily limited to, the seal maximum strip tensile strength and corresponding elongation, seal resistance to hydrostatic pressure of 140 mbar for 1 min (pressure test), seal resistance to penetration of 10% isopropanol & methylene blue solution, and ASTM F1671 "Standard Test Method for Resistance of Materials and in Protective Clothing to Penetration by Blood Borne Pathogens using PHI-X174 Bacteriophage Penetration as a Test System."

Tensile Strength & Elongation

The tensile strength and elongation were tested by cutting strips of material (e.g., nonwoven or bilaminate) perpendicular to the direction of a seam including a seal adhering a first portion of the material to a second portion of the material being tested. The cut strips were 2.0 inch wide and had a minimum length of 6 inch. The cut strips were pulled until failure as per standard test method WSP 110.4 (05) using a constant-rate-of-extension style of testing machine. In this regard, an initial distance between the jaws of 4.0 inches was used, and a rate of jaw separation of 11.8 inches per minute (30 cm/min) was also used. The maximum tensile strength and corresponding elongation were recorded for each cut sample.

Seal Resistance to Hydrostatic Pressure

For this test, a tube (e.g., hollow structure) of material was opened at the opposite side from the seam and, a square piece with dimension 7 inches×7 inches was cut with the seam located in a position that crossed near the middle of the square piece of cut material. This piece along with a retaining screen on top of it was mounted into a hydrostatic tester FX3000 sold by TEXTEST AG, Schwerzenbach, Switzerland; and the hydrostatic pressure was increased to 140 mbar at a rate of 60 mbar/min. The retaining screen was a woven polyester mesh, with >50% open area. When the pressure reached 140 mbar, the pressure was maintained there for 60 seconds. A rating of "pass" indicated no liquid leaking through the sample. A rating of "fail" was recorded at the first drop appearing within the 60 second period of time after the pressure reached 140 mbar.

Penetration Test

The purpose of this test is to study if a seal (e.g., a seam formed by a material and seal adhering the material to itself) leaks when exposed to a solution that simulates the surface tension of blood. For Samples 1 and 2 this test was performed on the bilaminate by itself while for the Comparative Sample 1 it was performed on the trilaminate. In all cases, however, a 4 inch wide by 10 inch long piece of material was cut and folded in its middle along the long axis to produce a C-folded piece having a width of 2 inches and a length of 10 inches. This C-folded piece was then thermal sealed (e.g., formation of a seal) in its middle along the long axis to form a tubed section that has an internal perimeter of about 2 inches.

An aqueous solution comprising 10% of isopropyl alcohol and 0.2% of methylene blue pigment was prepared. The tubed section was bent into a U-shape and filled with the solution until the solution was at 2 inches from the top on both sides of the U-shaped tubed section. The ends of the U-shaped tubed section were then pulled together by a paper clip and suspended in the air. The samples were inspected at time intervals for any sign of the colored solution having penetrated the seam via the seal. When the solution appears to have completely penetrated the seam via the seal at a first location, the time was recorded as the penetration time.

Example 1

A sleeve was produced using a spunbond nonwoven and a bilaminate. The spunbond nonwoven had a 24 gsm basis weight and was made from a formulation that comprised mainly isotactic polypropylene having a viscosity of 35 MFR as measured by the standard test method ISO 1133 (230° C. and 2.16 Kg). Such a spunbond nonwoven can be made on Reicofil spunbond production equipment sold by Reifenhäuser Reicofil, Troisdorf, Germany. The bilaminate was produced by bonding a breathable monolithic film to a SMS (spunbond-meltblown-spunbond composite) nonwoven using fiberized hot melt adhesive. The SMS nonwoven made of polypropylene consisted of a point bonded nonwoven that comprised a layer of meltblown fibers captured between two layers of continuous filaments. The SMS nonwoven had a basis weight of 20 gsm. The adhesive holding the film and the SMS nonwoven together was a hot melt adhesive that had been fiberized and applied in a random pattern using typical equipment that one knowledgeable in the art would be familiar with. This adhesive was applied uniformly at a rate of 2 gsm, however, it covered only a small fraction of the surface. As such, the adhesive did not significantly impact the breathability of the bilaminate. The monolithic breathable film was produced by a cast process and comprised (i) about 98% of a thermoplastic copolyester elastomer from DSM Engineering Plastics, Geleen, The Netherlands, having a MFR of 10 MFR (tested as per standard test ISO 1133 at 230° C. and under a load of 2.16 Kg) and was selected due to its high breathability and ease of processing into a film and (ii) about 2% polyethylene having a MFR of 25 (tested as per standard test ISO 1133 at 190° C. and under a load of 2.16 Kg).

The above spunbond nonwoven as well as the bilaminate were cut into isosceles trapezoid shapes, where the shorter base was 12 inches (e.g., the shorter base is the length of the shorter side that run perpendicular to the line of symmetry) and the longer base was 25 inches (e.g., the longer base is the length of the longer side of the trapezoid that run perpendicular to the line of symmetry) and the height is 25 inches (e.g., the height is defined as the length of a line that constitutes the line of symmetry for such trapezoid). The above spunbond nonwoven trapezoid shape was folded along the line of symmetry to form a sleeve tube and the overlapping edges were ultrasonically sealed together. The sealing pattern consisted of a narrow continuous line and two discontinuous lines running parallel to each other. The ultrasonic bonding unit was typical of what is used and should be known by people knowledgeable in the art.

The above bilaminate was sealed using an impulse heat sealer machine (model PW3024-545 by Packworld) by folding the trapezoidal shape along the line of symmetry and forming a seal along the edge to form a tube. The trapezoid shape was folded such that the film sides of the bilaminate were facing each other. Therefore, the seal for the seam was accomplished by fusing those film surfaces to each other in order to form a sleeve tube with an impervious seal (e.g., a seam structure including an impervious seal). For this operation, the impulse heat sealer machine was equipped with band shaped heating elements that were about 6 mm wide and the sealing conditions comprised (i) a temperature set point for sealing of 185° C.; (ii) for a sealing time of 3.0 seconds; (iii) at 75 psi of seal pressure; and (iv) a 50° C. cool-to temperature.

The sealing of the nonwoven and the bilaminate was done in a way that both sleeves had the same inside perimeter when comparing the same points along their length. The sleeve tube made from the spunbond nonwoven was inserted into the sleeve tube made from the bilaminate in a way that the seams were close and parallel to each other. The two sleeve tubes were then turned inside-out (e.g., inverted) to form a sleeve assembly (e.g., an article) suitable for any additional optional finishing steps (e.g., adding a sleeve cuff) and incorporated into, for example, a gown (e.g., by attaching the sleeve tubes to a gown through stitching or ultrasonic sealing). In this final configuration, the bilaminate sleeve tube formed the inner layer of the sleeve assembly while the spunbond nonwoven sleeve tube formed the outside of the sleeve assembly. For this example, the spunbond nonwoven sleeve tube, the bilaminate nonwoven sleeve tube, as well as the final assembly for the sleeve were tested and the results are reported in Table 1.

Example 2

A sleeve was produced using a SMS nonwoven and a bilaminate (e.g., a nonwoven-film bilaminate). The SMS nonwoven had a 44 gsm basis weight and was made of polypropylene. The SMS nonwoven comprised a layer of meltblown fibers positioned between two layers of continuous spunbond filaments. This SMS nonwoven was point bonded and was made on a Reicofil spunbond production equipment sold by Reifenhäuser Reicofil, Troisdorf, Germany. The bilaminate was made in the same manner as in Example 1.

The SMS nonwoven and bilaminate were cut into isosceles trapezoid shapes like in Example 1. The above SMS nonwoven was sealed using an impulse heat sealing machine (model PW3024-545 by Packworld) by folding the SMS nonwoven along the line of symmetry and sealing the edge to form a tube. For the formation of the tube, the seal machine was equipped with band shaped heating elements that were about 6 mm wide and the sealing conditions comprised (i) a temperature set point for sealing of 185° C.; (ii) for a sealing time of 3.0 seconds; (iii) at 75 psi of seal pressure; and (iv) a 50° C. cool-to temperature. The bilaminate was sealed like in Example 1.

The sealing of the SMS nonwoven and the bilaminate was done in a way that both sleeves had the same inside perimeter when comparing the same points along their length. The tube (e.g., sleeve tube) made from the SMS nonwoven was inserted into the tube (e.g., sleeve tube) made from the bilaminate in a way that the seams were close and parallel to each other. The two tubes (e.g., sleeve tubes) were then turned inside-out to form an article (e.g., sleeve assembly) suitable for any additional optional finishing steps (e.g., adding a sleeve cuff) and incorporated into, for example, a gown (e.g., by attaching the sleeve tubes to a gown through stitching or ultrasonic sealing). In this final configuration the bilaminate formed the inner layer of the sleeve assembly while the SMS nonwoven formed the outside of the sleeve assembly. For this example the SMS nonwoven sleeve tube, the bilaminate tube, as well as the final sleeve assembly were tested and the results are reported in Table 1.

Comparative Example 1

A trilaminate material was created that consisted of a 12 gsm breathable, fluid impervious monolithic barrier film sandwiched between a 24 gsm spunbond nonwoven and a 20 gsm SMS spunbond nonwoven, in which both nonwovens were made of polypropylene. The nonwoven layers were individually adhesively bonded to the film with 2 gsm of fiberized hot melt adhesive applied in the same manner as in Examples 1 and 2. The resulting trilaminate was represented as S/film/SMS (i.e., spunbond/film/spunbond-meltblown-spunbond structure). The monolithic film was the same as used for Examples 1 and 2. The nonwovens were, as was the case for Examples 1 and 2, produced on Reicofil production lines.

The above trilaminate was sealed using an impulse heat sealing machine (model PW3024-545 by Packworld) by first folding the trilaminate trapezoid shape along the line of symmetry with the spunbond side (SB) toward the inside and forming a seal along the edge to form a tube. For this sample, the impulse heat sealing machine was equipped with band shaped heating elements that were about 6 mm wide and the sealing conditions comprised (i) a temperature set point for sealing of 197° C.; (ii) for a sealing time of 5.3 seconds; (iii) at 60 psi of seal pressure; and (iv) a 50° C. cool-to temperature. These particular sealing conditions were found after experimentation to be optimal for this specific construction.

TABLE 1

|  | Part being tested | Tensile N/50 mm | Elongation % | Pressure Test 140 mbar × 1 min | Penetration Test min | Test: F1671 N = 3 |
| --- | --- | --- | --- | --- | --- | --- |
| Sample 1 | 24 gsm spunbond sleeve tube | 32.0 | 39.0 | NA | NA | NA |
|  | Bilaminate sleeve tube | 9.7 | 21.7 | pass | >120 min | Pass |
|  | Assembled sleeve tube | 35.9 | 33.6 | pass | NA | Pass |
| Sample 2 | 44 gsm SMS spunbond tube | 33.3 | 21.8 | NA | NA | NA |
|  | Bilaminate sleeve tube | 15.5 | 23.1 | pass | >120 min | Pass |
|  | Assembled sleeve tube | 49.2 | 21.8 | pass | NA | Pass |
| Comparative Sample 1 | Trilaminate sleeve tube | 30.38 | No Data | pass | 35 | Fail |

The test results for key properties of Example 1, Example 2, and Comparative Example 1 are summarized in Table 1. The results, as shown in Table 1, illustrate that the sleeve tubes for Examples 1 and 2 (both made from a nonwoven) had a stronger seam via the seal formed between joined portions of the nonwoven sleeve tubes as compared to the sleeve tubes made from the bilaminate (e.g., film-to-film seal). Additionally, the barrier properties, as expressed by the F1671 and penetration test results, were superior for Examples 1 and 2 (e.g., illustrative of certain embodiments in accordance with the invention) in comparison to Comparative Example 1.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. An article, comprising:
   (i) an outer fabric layer including an outer fabric layer seal; and
   (ii) a laminate comprising (a) a barrier film layer and (b) an inner fabric layer; the laminate including a laminate seal that is separate and distinct from the outer fabric layer seal; wherein the laminate is bonded to itself via the barrier film layer to define the laminate seal and to form a hollow laminate structure defining a laminate conduit, and wherein the barrier film layer includes particulate fillers therein that define a plurality of protrusions extending outwardly from the barrier layer film, and wherein the barrier film layer is located either directly or indirectly between the outer fabric layer and the inner fabric layer;
   wherein the outer fabric layer encircles and overlies the laminate.

2. The article of claim 1, wherein the outer fabric layer comprises a first side surface and a second side surface, the second side surface being located adjacent or proximate to the barrier film layer, and wherein the plurality of protrusions engage the second side surface of the outer fabric layer.

3. The article of claim 2, wherein the second side surface comprises a second surface coefficient of friction and the first side surface comprises a first surface coefficient of friction, said second surface coefficient of friction is greater than the first surface coefficient of friction.

4. The article of claim 1, wherein the barrier film layer is a single layer film.

5. The article of claim 1, wherein the barrier film layer is a multilayer film including a first outermost film layer comprising the plurality of protrusions.

6. The article of claim 5, wherein the multilayer film further comprises a monolithic film layer that is devoid of the particulate fillers.

7. The article of claim 1, wherein the particulate fillers comprise a particulate inorganic material.

8. The article of claim 7, wherein the particulate inorganic material comprises calcium carbonate, clay, silica, alumina, barium sulfate, sodium carbonate, talc, magnesium sulfate, titanium dioxide, zeolites, aluminum sulfate, cellulose-type powders, diatomaceous earth, magnesium sulfate, magnesium carbonate, barium carbonate, kaolin, mica, carbon, calcium oxide, magnesium oxide, aluminum hydroxide, glass particles, or any combinations thereof.

9. The article of claim 1, wherein the article is devoid of bonds between the outer fabric layer and the laminate.

10. The article of claim 1, wherein the article comprises one or more bonds attaching the article to a separate and distinct second article, and the article is devoid of bonds between the outer fabric layer and the laminate except for the one or more bonds attaching the article to the separate and distinct second article.

11. The article of claim 1, wherein the outer fabric layer encircles and overlies the laminate and defines an overlapping area, and wherein the overlapping area includes an unbonded portion being devoid of bonds between the outer fabric layer and the laminate, the unbonded portion comprising from about 75% to about 100% of the overlapping area.

12. The article of claim 1, wherein the outer fabric layer seal is at least 10% stronger than the laminate seal as determined by test method WSP 110.4(05).

13. The article of claim 1, wherein the outer fabric layer comprises a first nonwoven fabric and the inner fabric layer comprises a second nonwoven fabric, and wherein the outer fabric layer, the inner fabric layer, or both comprise a spunbond layer.

14. The article of claim 1, wherein the outer fabric layer further comprises a liquid repellant composition disposed thereon.

15. The article of claim 1, wherein the liquid repellant composition comprises at least one fluorochemical comprises at least one of a C4 fluorochemical, a C6 fluorochemical, a C8 fluorochemical, a C10 fluorochemical, or any combination thereof.

16. The article of claim 1, wherein the outer fabric layer is bonded to itself to define the outer fabric seal and to form a hollow outer fabric layer structure defining an outer fabric layer conduit.

17. The article of claim 16, wherein the outer fabric layer seal comprises a heat seal, adhesive seal, ultrasonic seal, mechanical seal, or any combinations thereof.

18. The article of claim 1, wherein the laminate seal comprises a continuous thermal seal formed by bonding the barrier film layer directly to itself, and wherein the continuous thermal seal extends from a first laminate end to a second laminate end.

19. The article of claim 1, wherein the outer fabric layer seal comprises an outer fabric layer seal elongation and the laminate seal comprises a laminate seal elongation, the outer fabric layer seal elongation is less than the laminate seal elongation when subjected to the same tensile force as determined by test method WSP 110.4(05).

20. The article of claim 1, wherein the article comprises a gown, a drape, a sleeve, a pant leg, a shoe cover, or a head-piece.

* * * * *